US008817886B2

(12) United States Patent
Jang et al.

(10) Patent No.: US 8,817,886 B2

(45) Date of Patent: Aug. 26, 2014

(54) BITSTREAM DECODING DEVICE HAVING A TOOLBOX WITH A PLURALITY OF FUNCTIONAL UNITS DISTINGUISHABLE VIA IDENTIFICATION INFORMATION AND A CORRESPONDING METHOD

(75) Inventors: Euee-Seon Jang, Seoul (KR); Sun-Young Lee, Seoul (KR); Sin-Wook Lee, Seoul (KR); Chung-Ku Lee, Incheon (KR)

(73) Assignee: Humax Co., Ltd., Seongnam-Si (KR)

( * ) Notice: Subject to any disclaimer, the term of this patent is extended or adjusted under 35 U.S.C. 154(b) by 513 days.

(21) Appl. No.: 12/581,002

(22) Filed: Oct. 16, 2009

(65) Prior Publication Data

US 2010/0034294 A1 Feb. 11, 2010

Related U.S. Application Data

(63) Continuation of application No. PCT/KR2008/002180, filed on Apr. 17, 2008.

(30) Foreign Application Priority Data

Apr. 17, 2007 (KR) ........................ 10-2007-0037434

(51) Int. Cl.
*H04N 19/00* (2014.01)
*H04N 7/26* (2006.01)

(52) U.S. Cl.
CPC ............ *H04N 19/00* (2013.01); *H04N 19/0533* (2013.01)
USPC ...................................................... 375/240.25

(58) Field of Classification Search
None
See application file for complete search history.

(56) References Cited

U.S. PATENT DOCUMENTS 6,330,365 B1 12/2001 Yasuda et al.
7,069,572 B2 * 6/2006 Stalker ............................ 725/34
2005/0265449 A1 12/2005 Yoon
2006/0109912 A1 5/2006 Winger et al.
2006/0227881 A1 * 10/2006 Gordon .................... 375/240.25
2009/0161767 A1 * 6/2009 Jang et al. ................ 375/240.24

FOREIGN PATENT DOCUMENTS

EP 1562383 A2 8/2005
JP 09-153820 * 6/1997
JP 09-153820 A 6/1997
JP 09-200767 A 7/1997
JP 10-248067 A 9/1998

(Continued)

OTHER PUBLICATIONS

"RVC Textual Description 2.0," ITU Study Group 16, No. N8041, Apr. 7, 2006.*

(Continued)

*Primary Examiner* — Joseph Ustaris
*Assistant Examiner* — Edemio Navas, Jr.
(74) *Attorney, Agent, or Firm* — Birch, Stewart, Kolasch & Birch, LLP

(57) ABSTRACT

Disclosed are a bitstream decoding device and a method thereof. The decoding device includes a toolbox, configured to include a plurality of functional units which independently perform a predetermined process—each of the functional units is distinguished by using unique identifiable information; and a connection control unit, configured to selectively load at least one functional unit by using the identifiable information and to control a bitstream to be decoded as video data. With the present invention, it is possible to decode bitstreams, encoded in various ways according to each standard, by using the same information recognizing method.

7 Claims, 23 Drawing Sheets

(56) References Cited

FOREIGN PATENT DOCUMENTS

| | | | |
|---|---|---|---|
| JP | 2004-343592 | A | 12/2004 |
| WO | WO 99/22524 | A1 | 5/1999 |
| WO | WO 2004/110028 | A1 | 12/2004 |
| WO | WO 2007/011116 | A1 | 1/2007 |
| WO | WO 2007/040297 | A1 | 4/2007 |

OTHER PUBLICATIONS

"Study of Reconfigurable Video Coding V2.0," ITU Study Group 16—Video Coding Experts Group, No. N8040, Apr. 7, 2006.*

"Working Draft 1.0 of Reconfigurable Video Coding (RVC)," ITU Study Group 16—Video Coding Experts Group, No. N8260, Jul. 28, 2006.*

International Organisation for Standardisation; Coding of Moving Pictures and Audio, Study of Reconfigurable Video Coding V2.0, Video Coding Experts Group, No. N8040, Apr. 2006.

Korean Office Action for Korean Patent Application No. 10-2007-0037434 dated Apr. 16, 2013.

Compact Representation of Decoder Descripton for MPEG Reconfigurable Video Coding, Hyungyu Kim, Hanyang University, Dec. 2006.

International Organisation for Standardisation; Coding of Moving Pictures and Audio, Study of Recon-figurable Video Coding V2.0, Video Coding Experts Group, No. N8040, Apr. 2006.

* cited by examiner

FIG. 8

| FU function | FU NAME |
|---|---|
| IS | MPEG4.algo.IS.luma.8x8 |
| | MPEG4.algo.IS.chroma.8x8 |
| | MPEG4.mgnt.IS |
| IT | MPEG2.algo.IT.luma.8x8 |
| | MPEG4.algo.IT.luma.8x8 |
| | MPEG4AVC.algo.IT.luma.4x4 |
| IQ | MPEG2.algo.quan.luma.8x8 |
| | MPEG2.algo.satu.luma.8x8 |
| ••• | ••• |

FIG. 9

| Index | Flag | Element Name | Length/Type | Global/Local | Note |
|---|---|---|---|---|---|
| C0 | 1bit | Decoding OK | 1 bit | Local | Boolean. To acknowledge whether the decoding process is clearly processing or not. |
| C1 | 1bit | Profile and level indication | 8 bit | Global | |
| C2 | 1bit | User data | 8 bit array | Global | An array of arbitrary length of user data. |
| C3 | 1bit | Visual object verID | 4 bit | Global | |
| ... | ... | ... | ... | ... | ... |
| C53 | 1bit | Alternate vertical scan flag | 1 bit | Global | |
| C54 | 1bit | VOP quant | 9 bit | Global | VLD: define CSCI storage for maximum length (9). |
| C55 | 1bit | Macro-block type | 3 bit | Global | |
| C56 | 1bit | Coded block pattern for Chroma | 1 bit array(2) | Global | |
| C57 | 1bit | D-quant | 2 bit | Global | |
| C58 | 1bit | AC prediction flag | 1 bit | Global | |
| ... | ... | ... | ... | ... | ... |
| C62 | 1bit | DCT Coefficients | 8 bit array(6)(64) | Global | |
| C63 | 1bit | GOP or VOP branch condition | 3 bit | Global | |
| C64 | 1bit | #frame | 32 bit | Global | |
| C65 | 1bit | #MB | 32 bit | Global | |
| C66 | 1bit | #Block | 8 bit | Global | |
| C67 | 1bit | #Total MB | 32 bit | Global | |

CSCIT

FIG. 10

<table>
<tr><th>Index</th><th>Element Name</th><th>Input</th><th>Output</th><th>Process by SET-PROC</th><th>Note</th></tr>
<tr><td>M</td><td>Marker Bit</td><td>1 bit</td><td>C0</td><td>READ 1 > C0;</td><td></td></tr>
<tr><td>S0</td><td>Visual object sequence start code</td><td>32 bit</td><td>C0</td><td>READ 32 B;<br>(C0=(IBS==HEX:1B0));</td><td></td></tr>
<tr><td>S1</td><td>Profile and level indication</td><td>8 bit</td><td>C1</td><td>READ 8 > C1;</td><td></td></tr>
<tr><td>S2</td><td>Visual object sequence end code</td><td>32 bit</td><td>C0</td><td>READ 32 B;<br>(C0=((IBS==HEX:1B1) || (EOF)));</td><td></td></tr>
<tr><td>S3</td><td>Is user data or not</td><td>32 bit</td><td>[C2]</td><td>SEEK 32 B;<br>IF(IBS==HEX:1B2){SET C2;}</td><td>Seek next bits and branch before physically read a start code.</td></tr>
<tr><td>S4</td><td>User data start code</td><td>32 bit</td><td>C0</td><td>READ 32 B;<br>(C0=(IBS==HEX:1B2);</td><td></td></tr>
<tr><td>S5</td><td>User data</td><td>8 bit (Array)</td><td>C2</td><td>SEEK 24;<br>WHILE (IBS != 1) {READ 8;PUSH C2 IBS;SEEK 24;}</td><td></td></tr>
<tr><td>S6</td><td>Visual object start code</td><td>32 bit</td><td>C0<br>[C3]<br>[C4]</td><td>READ 32 B;<br>(C0=(IBS==HEX:1B5));<br>SET C3, C4;</td><td>Default some values.</td></tr>
<tr><td>S7</td><td>Is visual object identifier</td><td>1 bit</td><td>[C13]<br>[C14]</td><td>READ 1;<br>If(IBS==1){SET C13, C14;}</td><td></td></tr>
</table>

SET 1/4

FIG. 11

| | | | | | |
|---|---|---|---|---|---|
| S8 | Visual object verID | 4 bit | [C6] | READ 4 > C3; | |
| S9 | Visual object priority | 3 bit | C4 | READ 3 > C4; | |
| S10 | Visual object type | 4 bit | C5 | READ 4 > C5; | |
| S11 | Video object start code | 32 bit | C0 | READ 32 B;<br>(C0=(IBS in HEX:100~HEX:11F)); | |
| S12 | Video signal type | 1 bit | [C6]<br>[C7] | READ 1;<br>If(IBS==1){SET C6, C7;} | Default some values. |
| S13 | Video format | 3 bit | C6 | READ 3 > C6; | |
| ... | ... | ... | ... | ... | ... |
| S32 | Video object layer shape | 2 bit | C20 | READ 2 > C20; | |
| S33 | VOP time increment resolution | 16 bit | C21<br>C0 | READ 16 > C21;<br>(C0=(C21!=0)); | 0 is forbidden. |
| S34 | Fixed VOP rate | 1 bit | C22 | READ 1 > C22; | |
| S35 | Fixed VOP time increment | 1~16bit | C23 | READ BITSIZE:C21 > C23; | Length can varied by value of VOP time increment resolution. |
| S36 | Video object layer width | 13 bit | C24<br>C0 | READ 13 > C24;<br>(C0=(C24!=0)); | 0 is forbidden. |
| S37 | Video object layer height | 13 bit | C25<br>C0 | READ 13 > C25;<br>(C0=(C25!=0)); | 0 is forbidden. |

SET 2/4

FIG. 12

| | | | | | |
|---|---|---|---|---|---|
| S38 | Interlaced | 1 bit | C26 | READ 1 > C26; | |
| S39 | OBMC disable | 1 bit | C27 | READ 1 > C27; | |
| S40 | Sprite enable | 1/2 bit | C28 | IF (C13==1) { READ 1 > C28; }<br>ELSE { READ 2 > C28; } | |
| ... | ... | ... | ... | ... | ... |
| S55 | Reduced resolution VOP enable | 1 bit | C39 | READ 1 > C39; | |
| S56 | Scalability | 1 bit | C40 | (C40=0); | Do not read this syntax.<br>(A difference between<br>VCTR ref SW and ISO 14496-2)<br>Original code of<br>this syntax:READ 1 > C40; |
| S57 | GOP or VOP appears | 32 bit | C63 | SEEK 24 B;<br>IF (IBS!=1) { READ 8 B;IF (EOF)<br>{ (C63=4); STOP; }}SEEK 32 B;<br>IF (IBS==HEX:1B3) { (C63=1); }<br>ELSE IF (IBS==HEX:1B6) { (C63=2); }<br>ELSE IF (IBS==HEX:1B1)<br>{ (C63=3); }ELSE { (C63=0); } | |
| S58 | Group of VOP start code | 32 bit | C0 | READ 32 B;<br>(C0=(IBS==HEX:1B3)); | |
| S59 | Time code (Hours) | 5 bit | C41 | READ 5 > C41 | Time code element |
| S60 | Time code (Minutes) | 6 bit | C42 | READ 6 > C42; | Time code element |
| S61 | Time code (Seconds) | 6 bit | C43 | READ 6 > C43; | Time code element |

SET 3/4

FIG. 13

| | | | | | |
|---|---|---|---|---|---|
| S62 | Closed GOV | 1 bit | C44 | READ 1 > C44; | |
| ... | ... | ... | ... | ... | ... |
| S75 | D-quant | 2 bit | C57 | READ 2 > C57; | |
| S76 | AC prediction flag | 1 bit | C58 | READ 1 > C58; | |
| S77 | CBPY | 1~6 bit | C59 | VLD [1];(C59[0]=DIGIT:IBS_1);<br>(C59[1]=DIGIT:IBS_2);<br>(C59[2]=DIGIT:IBS_3);<br>(C59[3]=DIGIT:IBS_4); | |
| S78 | DCT DC size luminance | 2~11 bit | C60 | VLD [2] > C60[C66]; | |
| ... | ... | ... | ... | ... | ... |
| S81 | DCT Coefficients | 19 bit | C62 | IF (C66<4) {(V7 = (3 - C66));<br>(V1=(DIGIT:C59_V7));}<br>ELSE {(V7 = (5 -C66));<br>(V1=(DIGIT:C56_V7));}<br>IF (V1 != 0) {(V5 = 0);<br>UNTIL (V5 == 0) {VLD [4] > V2;<br>RLD V2,V3,V4,V5,T4;(V6 = 1);<br>WHILE (V6 < V4) {(C62[C66][V6] = 0);<br>(V6++);}(C62[C66][V6] = V3);(V6++);}<br>WHILE (V6 < 64) {(C62[C66][V6] = 0);(V6++);}} | |

SET 4/4

FIG. 14

<table>
<tr><th>Index</th><th>Syntax</th><th>Input</th><th>No. of Branches</th><th>Branch information</th><th>Note</th></tr>
<tr><td>ERR</td><td>-</td><td>-</td><td>-</td><td>None.</td><td>An FSM state that identifies a fatal error occurred during decoding process.</td></tr>
<tr><td>R0</td><td>S0</td><td>C0</td><td>2</td><td>1: (C0==1) GO R1;<br>2: GO ERR;</td><td>VS start code</td></tr>
<tr><td>R1</td><td>S1</td><td>-</td><td>1</td><td>1: GO R2;</td><td></td></tr>
<tr><td>R2</td><td>S3</td><td>[C2]</td><td>2</td><td>1: ([C2]==1) GO R3;<br>2: GO R5;</td><td>User data or not</td></tr>
<tr><td>R3</td><td>S4</td><td>-</td><td>1</td><td>1: GO R4;</td><td>User data start code</td></tr>
<tr><td>R4</td><td>S5</td><td>-</td><td>1</td><td>1: GO R5;</td><td>User data</td></tr>
<tr><td>R5</td><td>S6</td><td>C0</td><td>2</td><td>1: (C0==1) GO R6;<br>2: GO ERR;</td><td>VO start code</td></tr>
<tr><td>R6</td><td>S7</td><td>[C13]<br>[C14]</td><td>2</td><td>1: ([C13]==1 && [C14]==1) R7;<br>2: GO R9;</td><td>Branch : VO identifier</td></tr>
<tr><td>R7</td><td>S8</td><td>-</td><td>1</td><td>1: GO R8;</td><td></td></tr>
<tr><td>R8</td><td>S9</td><td>-</td><td>1</td><td>1: GO R9;</td><td></td></tr>
<tr><td>R9</td><td>S10</td><td>C5</td><td>2</td><td>1: ((C5==1) || (C5==2)) GO R10;<br>2: GO R17;</td><td>Branch : Video signal type parameters by VO type</td></tr>
<tr><td>R10</td><td>S12</td><td>[C6]<br>[C7]</td><td>2</td><td>1: ([C6]==1 && [C7]==1) GO R11;<br>2: GO R17;</td><td>Branch : Video signal type →</td></tr>
<tr><td>...</td><td>...</td><td>...</td><td>...</td><td>...</td><td>...</td></tr>
</table>

| | | | | | |
|---|---|---|---|---|---|
| R20 | S11 | C0 | 2 | 1: (C0==1) GO R21;<br>2: GO ERR; | Video object start code |
| R21 | S19 | C0 | 2 | 1: (C0==1) GO R22;<br>2: GO ERR; | Video object layer start code |
| R22 | S20 | - | 1 | 1: GO R23; | |
| R23 | S21 | C12 | 2 | 1: (C12==BIN:00010010) GO ERR;<br>2: GO R24; | VO type indication=Fine Granularity Scalable →<br>Do not process this branch now yet. (SP/ASP) |
| R24 | S22 | [C13]<br>[C14]<br>[C15] | 2 | 1: ([C13]==1 && [C14]==1<br>&& [C15]==1) GO R25;<br>2: GO R27; | Branch : VOL identifiers → |
| R25 | S23 | - | 1 | 1: GO R26; | |
| R26 | S24 | - | 1 | 1: GO R27; | |
| R27 | S25 | C15 | 2 | 1: (C15==BIN:1111) GO R28;<br>2: GO R30; | Branch : Extended-PAR parameters → |
| R28 | S26 | C0 | 1 | 1: (C0==1) GO R29;<br>2: GO ERR; | Forbidden value check |
| R29 | S27 | C0 | 1 | 1: (C0==1) (C67=(C24*C25/256));<br>GO R30;<br>2: GO ERR; | Forbidden value check |
| R30 | S28 | [C18]<br>[C19] | 2 | 1: ([C18]==1 && [C19]==1) GO R31;<br>2: GO R34; | Branch : VOL control parameters → |
| R31 | S29 | - | 1 | 1: GO R32; | |
| R32 | S30 | - | 1 | 1: GO R33; | |

| | | | | | |
|---|---|---|---|---|---|
| R33 | S31 | [C20] | 2 | 1: ([C20]=1) GO ERR; 2: GO R34; | VBV parameters → Do not process this branch now yet. (SP/ASP) |
| R34 | S32 | C20 C12 | 2 | 1: ((C20==3) && (C12!=1)) GO ERR; 2: GO R35; | Video object layer shape extension → Do not process this branch now yet. (SP/ASP) |
| R35 | M | C0 | 2 | 1: (C0==1) GO R36; 2: GO ERR; | Marker bit |
| ... | ... | ... | ... | ... | ... |
| R49 | S40 | C28 | 2 | 1: ((C28==1) \|\| (C28==2)) GO ERR; 2: GO R50; | Sprite enable: Length variation branch is controlled in SET. Sprite enabled (static, GMC) syntax → Do not process this branch now yet. (SP/ASP) |
| R50 | – | C13 C20 | 2 | 1: ((C13!=1) && (C20!=0)) GO ERR; 2: GO R51; | SADCT disable → Do not process this branch now yet. (SP/ASP) |
| R51 | S41 | – | 1 | 1: GO R52; | |
| R52 | S42 | C30 | 2 | 1: (C30==1) GO R53; 2: GO R59; | Branch : Matrix loadings → |
| R53 | S43 | [C31] | 2 | 1: ([C31]==1) GO R54; 2: GO R55; | Branch : Load intra matrix or not → |
| R54 | S44 | C0 | 2 | 1: (C0==1) GO R56; 2: GO ERR; | |
| ... | ... | ... | ... | ... | ... |
| R65 | – | C13 | 2 | 1: (C13!=1) GO R66; 2: GO R68; | Branch : New-prediction → |

FIG. 17

| | | | | | |
|---|---|---|---|---|---|
| R66 | S54 | C38 | 2 | 1: (C38==1) GO ERR;<br>2: GO R67; | New-prediction parameters →<br>Do not process this branch now yet. (SP/ASP) |
| R67 | S55 | - | 1 | 1: GO R68; | |
| R68 | S56 | C40 | 2 | 1: (C40==1) GO ERR;<br>2: GO R69; | Scalability parameters →<br>Do not process this branch now yet. (SP/ASP) |
| R69 | S3 | [C2] | 2 | 1: ([C2]==1) GO R70;<br>2: GO R72; | User data or not |
| R70 | S4 | - | 1 | 1: GO R71; | User data start code |
| R71 | S5 | - | 1 | 1: GO R72; | User data |
| R72 | S57 | - | 1 | 1: GO RT; | Branch : GOP or VOP → |
| R73 | S58 | C0 | 2 | 1: (C0==1) GO R74;<br>2: GO ERR; | Group of VOP start code |
| R74 | S59 | - | 1 | 1: GO R75; | |
| ... | ... | ... | ... | ... | ... |

| name | value | code |
|---|---|---|
| MCBPC | 0 | 1 |
| MCBPC | 1 | 001 |
| MCBPC | 2 | 010 |
| ... | ... | ... |
| MCBPC | 8 | 000000001 |
| MCBPC | 9 | NULL |
| CBPY | 0 | 0011 |
| CBPY | 1 | 00101 |
| CBPY | 2 | 00100 |
| ... | ... | ... |
| CBPY | 17 | 000001 |
| CBPY | 18 | NULL |
| intraDCy | 0 | 011 |
| intraDCy | 1 | 11 |
| intraDCy | 2 | 10 |

DVT 1/2

FIG. 19

| | | |
|---|---|---|
| intraDCy | 3 | 010 |
| ... | ... | ... |
| intraDCy | 12 | 00000000001 |
| intraDCy | 13 | NULL |
| intraDCc | 0 | 11 |
| intraDCc | 1 | 10 |
| intraDCc | 2 | 01 |
| ... | ... | ... |
| intraDCc | 12 | 000000000001 |
| intraDCc | 13 | NULL |
| DCT intra | 0 | 10 |
| DCT intra | 1 | 1111 |
| ... | ... | ... |
| DCT intra | 101 | 000001011111 |
| DCT intra | 102 | 0000011 |
| DCT intra | 103 | NULL |

DVT 2/2

FIG. 20

| Command | Method | Example |
|---|---|---|
| READ | READ bits B > CSCI; | READ 32 B > C0;<br>READ 8;<br>READ 1 > C12; |
| SEEK | SEEK bits B > CSCI; | SEEK 32 B > C0; |
| FLUSH | FLUSH bits B; | FLUSH 8; |
| IF | IF (condition) { ~ }<br>ELSE { ~ } | |
| WHILE | WHILE (condition) { ~ } | |
| UNTIL | UNTIL (condition) { ~ } | |
| DO~WHILE | DO { ~ } WHILE (condition) | |
| DO~UNTIL | DO { ~ } UNTIL (condition) | |
| ( ~ ) (compute) | ( ……… ) | (C11=(V2+3)); |
| BREAK | BREAK; | |
| SET | SET CSCI, CSCI… ; | SET C0, C2; |
| STOP | STOP; | |
| PUSH | PUSH CSCI Value, Value… ; | PUSH C8 8, 16, 32; |
| GO | GO R#;; | GO R23; |
| HEX | HEX:value; | HEX:0F; |
| RLD | RLD index, level, run, islastrun, t#; | RLD V1, V2, V3, V4, T4; |
| VLD2 | VLD2 [T#] in > v1, v2, v3; | VLD2 [0] IBS > V1, V2, V3; |
| VLD4 | VLD4 [T#] > CSCI; | VLD4 [0] > C56; |

2300

BITSTREAM DECODING DEVICE HAVING A TOOLBOX WITH A PLURALITY OF FUNCTIONAL UNITS DISTINGUISHABLE VIA IDENTIFICATION INFORMATION AND A CORRESPONDING METHOD

This application is a Continuation of PCT/KR2008/002180 filed on Apr. 17, 2008, and claims priority under 35 U.S.C. §119(a) on Patent Application No. 10-2007-0037434 filed in the Republic of Korea on Apr. 17, 2007, respectively, all of which are hereby expressly incorporated by reference into the present application.

TECHNICAL FIELD

The present invention relates to a bitstream decoding device and a method thereof, more specifically to a bitstream decoding device and a method thereof that includes a decoding solution.

BACKGROUND ART

Typically, a video is converted to a bitstream by an encoder. At this time, the bitstream is stored depending on a coding type that satisfies the constraint condition of the encoder.

MPEG requests syntax and semantics, which are the constraint condition of the encoder.

The syntax, which refers to the structure, format, or length of data, shows the sequence of expressing the data. In other words, the syntax is to meet a rule for encoding/decoding and defines the sequence and length of each element of the bitstream and a corresponding data format.

The semantics refers to the meaning of each bit that constitutes data. In other words, the semantics shows the meaning of each element of the bitstream.

Accordingly, the bitstream can be generated in various types depending on the encoding condition or the applied standard (or codec) of the encoder. Typically, each standard (e.g. MPEG-1, MPEG-2, MPEG-4 and MPEG-4 AVC) has different bitstream syntaxes.

Accordingly, it may be considered that the bitstream encoded according to each standard or encoding condition has different types (i.e. syntax and semantics). A decoder corresponding to a pertinent encoder must be used to perform the decoding of the bitstream.

As described above, the conventional bitstream decoder has a restriction that must satisfy the constraint condition of the encoder. This restriction makes it difficult to realize an integration decoder corresponding to a plurality of standards.

DISCLOSURE

Technical Problem

Accordingly, the present invention, which is contrived to solve the aforementioned problems, provides a bitstream decoding device and a method thereof that can decode a bitstream encoded in various types (syntaxes and semantics) in accordance with each standard (e.g. MPEG-1, MPEG-2, MPEG-4 and MPEG-4 AVC) by using the same information recognizing method.

Also, the present invention provides a bitstream decoding device and a method thereof that can parse a bitstream compressed in various methods by using the same information analyzing method and organically control each functional unit to perform the decoding by using the parsed data.

The present invention provides a bitstream decoding device and a method thereof that can distinguish and manage each functional unit of a toolbox by using independent ID or/and name.

The present invention provides a bitstream decoding device and a method thereof that can commonly apply a syntax analyzing method for decoding various types of bit streams.

The present invention provides a bitstream decoding device and a method thereof that can easily decode a bitstream when a syntax element is changed, added or deleted.

The present invention provides a bitstream decoding device and a method thereof that can allow some elements used to decode a bit stream to share the element information of analyzed syntax (i.e. a result from syntax parsing).

The present invention provides a bitstream decoding device and a method thereof that can allow the element information of analyzed syntax to be used to analyze the syntax element of a following bit stream.

The present invention provides a bitstream decoding device and a method thereof that can group various functions constituting decoding methods suggested by a variety of standards (or codec) according to each functional unit to put the grouped functions in a toolbox.

The present invention provides a bitstream decoding device and a method thereof that can selectively load some functional units necessary for a toolbox and allow a corresponding predetermined process to be performed in order to decode a bitstream encoded in various forms.

The present invention provides a bitstream decoding device and a method thereof that can change, add or delete the functional units equipped in a toolbox. In addition, the present invention provides a bitstream decoding device and a method thereof that can internationally standardize the concept and structure of codec integration for bitstream decoding. Other problems that the present invention solves will become more apparent through the following description.

Technical Solution

To solve the above problems, an aspect of the present invention features an encoder/a decoder and/or an integrated codec apparatus that can be universally used for various standards.

According to an embodiment of the present invention, the decoding device can include a toolbox, configured to include a plurality of functional units which independently perform a predetermined process and is distinguished by using a unique identifiable information; and a connection control unit, configured to selectively load at least one functional unit by using the identifiable information and to control a bitstream to be decoded as a video datum.

The identifiable information of each functional unit can be formed to include a combination of at least two of an application standard field (STANDARD), a list field (LIST) specifying a plurality of application standards, a role field (ROLE) according to a function distinguishment, a name field (NAME) corresponding to a performing algorithm of a functional unit, a property field (PROPERTY) indicating a property of a functional unit or information related to a process, a size field (SIZE) indicating a size of a block to be processed by a functional unit and an implementation field (IMPLEMENTATION) indicating additional information related to a performance of a functional unit.

The toolbox can be formed to include subtoolboxes which are sets of functional units formed based on the application standard field.

The toolbox can include at least one parsing functional unit, configured to perform a syntax parsing of the bitstream and a plurality of decoding functional units, configured to decode the bitstream.

The decoding device can include a decoder forming unit, configured to use partial decoder descriptions stored at a description storing unit to generate and output a CSCI control information and a connection control information. At this time, the connection control unit can use at least one of the CSCI control information and the connection control information to control the plurality of functional units of the toolbox to be selectively loaded.

The decoder forming unit can include a FU checking unit, configured to determine whether a plurality of functional units written at a partial decoder description are included at the toolbox; and an information processing unit, configured to use the partial decoder descriptions to generate the CSCI control information and the connection control information.

The decoding device can further include a decoding solution. At this time, the decoding solution can include a CSCI (control signal/context information) storing unit, configured to store a plurality of element information generated by a syntax parsing of the bitstream, executed by allowing at least one functional unit of the plurality of functional units to perform a process; and the connection control unit.

The decoding solution can further include at least one parsing functional unit, configured to perform the syntax parsing of the bitstream according to the CSCI control information. At this time, the toolbox can include a plurality of decoding functional units for decoding the bitstream.

The decoding solution can include a working memory, configured to allow at least one functional unit to be loaded and operated.

The decoding device can further include a description storing unit, configured to store partial decoder descriptions for controlling operations of some or all of the functional units; and a description decoder, configured to use an encoded decoder description, inputted corresponding to the bitstream, to generate at least one partial decoder description and store the generated partial decoder description(s) or to designate at least one of a plurality of partial decoder descriptions prestored at the description storing unit.

The decoding device can further include a decoder forming unit. At this time, the decoder forming unit can include a storing unit, configured to store at least one of a datum for decoding processing and a CSCI (control signal/context information) information generated by allowing at least one functional unit to perform a process; and the connection control unit.

A working memory for a performance of a process of a functional unit loaded by a control of the decoder forming unit can be included at the decoder forming unit or formed by being coupled to the decoder forming unit.

The decoding device can further include a dividing unit, configured to divide an integrated bitstream, which the encoded decoder description and the bitstream are integrated in, into the encoded decoder description and the bitstream and to output the encoded decoder description and the bitstream if the integrated bitstream is inputted.

A functional unit loaded by the connection control unit can perform a predetermined process having at least one of a predesignated element information and an output datum outputted by a previously loaded functional unit as an input datum.

The parsing functional unit uses the CSCI control information to generate an element information.

To solve the aforementioned problems, another aspect of the present invention features a decoding method/an encoding method that can be universally used for various standards and/or a recorded medium recorded with a program for executing the method thereof.

According to an embodiment of the present invention, the decoding method can include (a) generating and storing a plurality of partial decoder descriptions corresponding to an inputted decoder description; (b) using the partial decoder descriptions to generate a CSCI control information and a connection control information; (c) storing a plurality of element information, generated by a syntax parsing of a bitstream by using the CSCI control information, at a storing unit; and (d) using the connection control information and the element information to decode an encoded video datum of the bitstream as a video datum and to output the video datum.

The (c) and (d), respectively, can be executed by a functional unit, selectively loaded by a connection control unit with reference to the CSCI control information or the connection control information, among a plurality of functional units of the toolbox. At this time, each of the functional units is distinguished by using an unique identifiable information.

The identifiable information of each functional unit can be formed to include a combination of at least two of an application standard field (STANDARD), a list field (LIST) specifying a plurality of application standards, a role field (ROLE) according to a function distinguishment, a name field (NAME) corresponding to a performing algorithm of a functional unit, a property field (PROPERTY) indicating a property of a functional unit or information related to a process, a size field (SIZE) indicating a size of a block to be processed by a functional unit and an implementation field (IMPLEMENTATION) indicating additional information related to a performance of a functional unit.

The (d) can be repeatedly performed until a result according to processes, performed by a plurality of functional units which started their operations by a selective loading of the connection control unit, becomes the video data.

A result datum of a pertinent functional unit among a plurality of successively loaded functional units can be written at a buffer memory which is accessible by a following functional unit.

The connection control unit can provide a result datum of a pertinent functional unit among a plurality of successively loaded functional units as an input datum of a following functional unit.

The decoder description can be inputted in a form of an integrated bitstream integrated with the bitstream.

According to another embodiment of the present invention, a recorded medium tangibly embodying a program of instructions executable by a decoding device to perform a decoding method, the recorded medium being readable by the decoding device, including generating and storing a plurality of partial decoder descriptions corresponding to an inputted decoder description; using the partial decoder descriptions to generate a CSCI control information and a connection control information; storing a plurality of element information, generated by a syntax parsing of a bitstream by using the CSCI control information, at a storing unit; and using the connection control information and the element information to decode an encoded video datum of the bitstream as a video datum and to output the video datum.

Advantageous Effects

As described above, a bitstream decoding device and a method thereof in accordance with the present invention can decode a bitstream encoded in various types (syntax and semantics) in accordance with each standard (e.g. MPEG-1, MPEG-2, MPEG-4 and MPEG-4 AVC) by using the same information recognizing method.

Also, the present invention can distinguish and manage each functional unit of a toolbox by using independent ID or/and name.

Also, the present invention can parse a bitstream compressed in various methods by using the same information analyzing method and organically control each functional unit for the decoding by using the parsed data.

The present invention can commonly apply a syntax analyzing method for decoding various types of bitstreams.

The present invention can easily decode a bitstream when a syntax element is changed, added or deleted.

The present invention can allow some elements used to decode a bitstream to share the element information of analyzed syntax (i.e. a result from syntax parsing).

The present invention can allow the element information of analyzed syntax to be used to analyze the syntax element of a following bitstream.

The present invention can be used for the integration of a video or a still image performing the processing in units of blocks except for MPEG-1, MPEG-2, MPEG-4 and MPEG-4 AVC.

The present invention can group the functions constituting various decoding methods suggested by a variety of standards (or codec) according to each functional unit to put the grouped functions in a toolbox.

The present invention can selectively load some functional units necessary for a toolbox and perform the decoding in order to decode a bitstream encoded in various forms.

In addition, the present invention can change, add or delete the functional units equipped in a toolbox.

DESCRIPTION OF DRAWINGS

FIG. 8 is an example showing how functional units (FU name) are distinguished in accordance with an embodiment of the present invention;

FIG. 9 through FIG. 19 are examples showing how each partial decoder description is formed in accordance with an embodiment of the present invention;

FIG. 20 is an example of a command for constituting a partial decoder description in accordance with an embodiment of the present invention;

MODE FOR INVENTION

Figure 1:
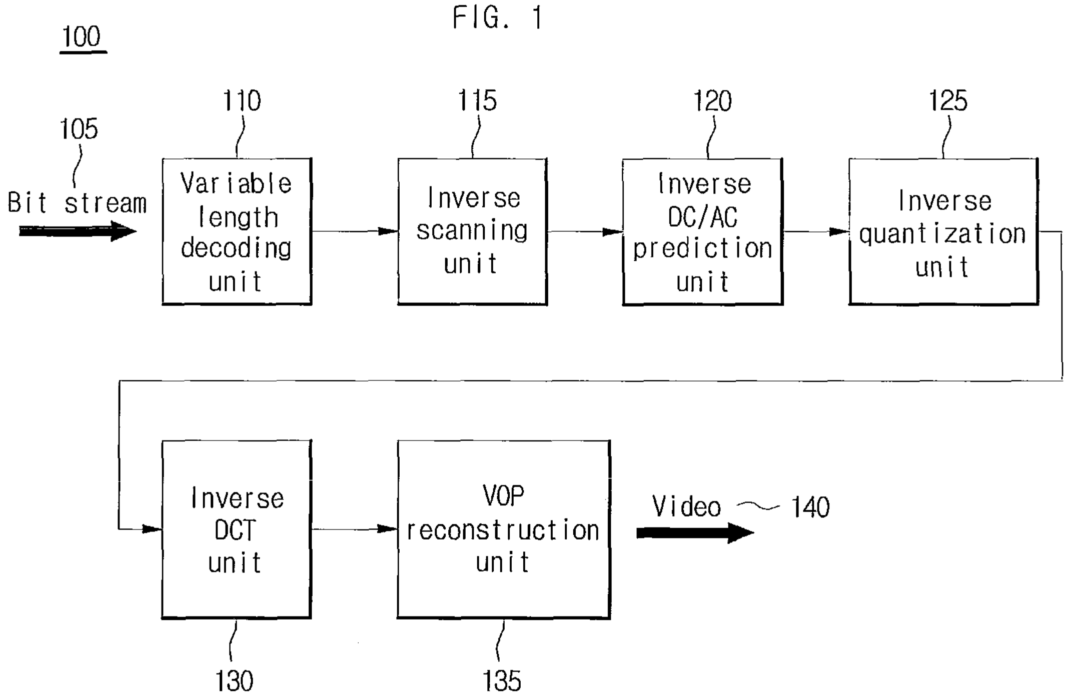
FIG. 1 shows a brief structure of a typical decoder.

Since there can be a variety of permutations and embodiments of the present invention, certain embodiments will be illustrated and described with reference to the accompanying drawings. This, however, is by no means to restrict the present invention to certain embodiments, and shall be construed as including all permutations, equivalents and substitutes covered by the spirit and scope of the present invention.

Terms such as “first” and “second” can be used in describing various elements, but the above elements shall not be restricted to the above terms. The above terms are used only to distinguish one element from the other. For instance, the first element can be named the second element, and vice versa, without departing the scope of claims of the present invention. The term “and/or” shall include the combination of a plurality of listed items or any of the plurality of listed items.

When one element is described as being “connected” or “accessed” to another element, it shall be construed as being connected or accessed to the other element directly but also as possibly having another element in between. On the other hand, if one element is described as being “directly connected” or “directly accessed” to another element, it shall be construed that there is no other element in between.

The terms used in the description are intended to describe certain embodiments only, and shall by no means restrict the present invention. Unless clearly used otherwise, expressions in the singular number include a plural meaning. In the present description, an expression such as “comprising” or “consisting of” is intended to designate a characteristic, a number, a step, an operation, an element, a part or combinations thereof, and shall not be construed to preclude any presence or possibility of one or more other characteristics, numbers, steps, operations, elements, parts or combinations thereof.

Unless otherwise defined, all terms, including technical terms and scientific terms, used herein have the same meaning as how they are generally understood by those of ordinary skill in the art to which the invention pertains. Any term that is defined in a general dictionary shall be construed to have the same meaning in the context of the relevant art, and, unless otherwise defined explicitly, shall not be interpreted to have an idealistic or excessively formalistic meaning.

Hereinafter, some embodiments of an integrated codec apparatus and a method thereof in accordance with an embodiment of the present invention will be described in detail with reference to the accompanying drawings. Identical or corresponding elements will be given the same reference numerals, regardless of the figure number, and any redundant description of the identical or corresponding elements will not be repeated.

Figure 2:
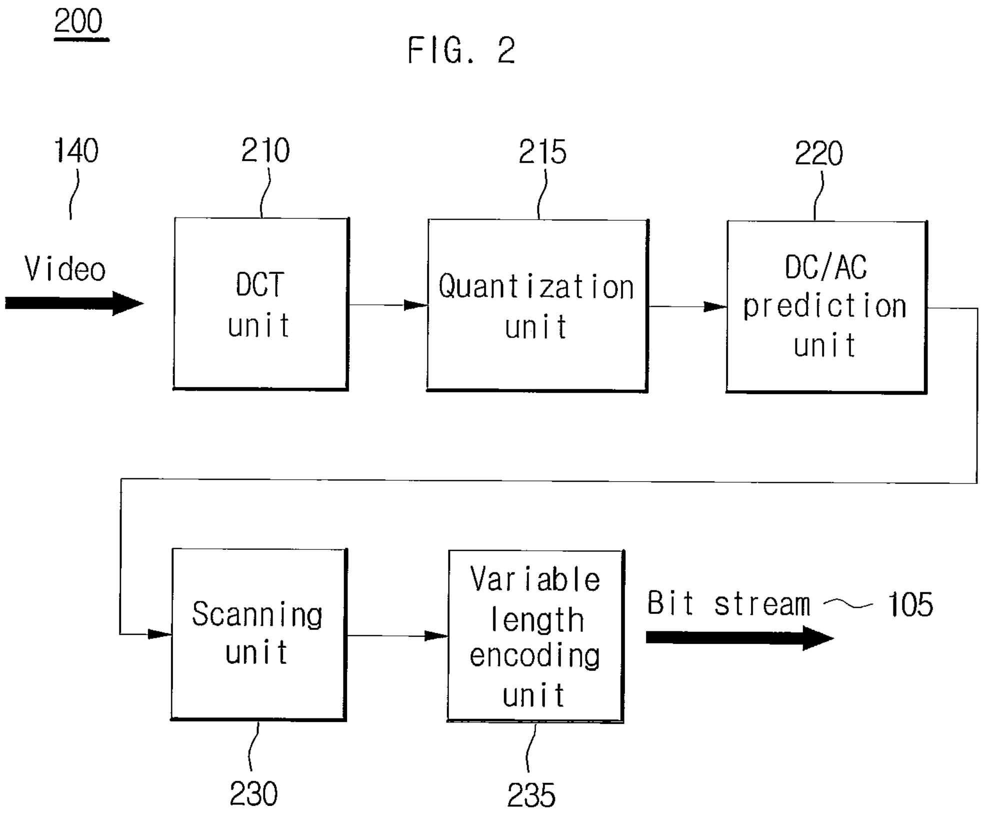
FIG. 2 shows a brief structure of a typical encoder.

FIG. 1 shows a brief structure of a typical decoder, and FIG. 2 shows a brief structure of a typical encoder.

As illustrated in FIG. 1, an MPEG-4 decoder 100 typically includes a variable length decoding unit 110, an inverse scanning unit 115, an inverse DC/AC prediction unit 120, an inverse quantization unit 125, an inverse discrete cosine transform unit 130 and a VOP reconstruction unit 135. It shall be evident that the decoder 100 can have a changeable structure depending on an applied standard and some elements can be replaced with different elements.

If a transferred bit stream is syntax-parsed and corresponding header information and image data are extracted, the variable length decoding unit 110 determines a quantized discrete cosine transform (DCT) coefficient by using a predetermined Huffman table and the inverse scanning unit 115 generates data having the same sequence as a corresponding video 140 by performing inverse scanning. In other words, the inverse scanning unit 115 outputs corresponding values in the inverse order of scanning by various methods. In the encoding, after the quantization is performed, a scanning direction can be determined depending on the distribution of a frequency range. Typically, the scanning method can be performed in a zigzag form. Alternatively, the scanning can be performed per codec in various ways.

Syntax parsing can be integratedly performed by the variable length decoding unit 110 or an element for processing a bitstream 105 prior to the variable length decoding unit 110. In this case, since the same standard is applied to the corresponding encoder and decoder, the syntax parsing is processed by a predetermined setting only, to correspond to the pertinent standard.

The inverse DC/AC prediction unit 120 determines the direction of a reference block for prediction by using the size of the DCT coefficient at a frequency band.

The inverse quantization unit 125 performs the inverse quantization of inversely scanned data. In other words, the inverse quantization unit 125 returns DC and AC coefficients by using a quantization parameter (OP) designated in an encoding process.

The inverse discrete cosine transform unit 130 evaluates an actual video data pixel value to generate a video object plane (VOP) by performing an inverse discrete cosine transform.

The VOP reconstruction unit 135 decodes a video signal by using the VOP generated by the inverse discrete cosine transform unit 130 and outputs the decoded signal.

As illustrated in FIG. 2, an MPEG-4 encoder 200 typically includes a discrete cosine transform unit 210, a quantization unit 215, a DC/AC prediction unit 220, a scanning unit 230 and a variable length encoding unit 235.

Each element included in the encoder 200 performs the inverse functions of the corresponding elements of the decoder 100. This is evident to any person of ordinary skill in the art. Briefly describing, the encoder 200 converts a video signal (i.e. a digital video pixel value) to a frequency value through the DCT and the quantization in order to performs the encoding. Then, the encoder 200 performs variable length encoding that differentiates the length of a corresponding bit according to the frequency of information to output it in a compressed bitstream format.

Figure 3:
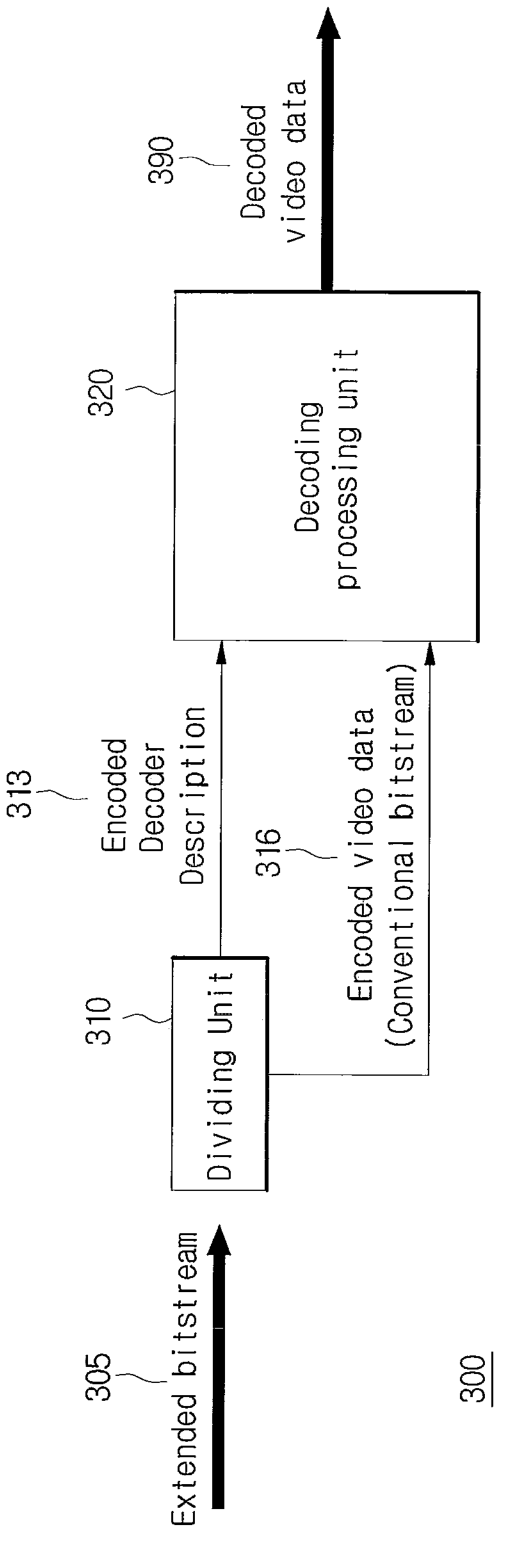
FIG. 3 shows a brief structure of a decoder in accordance with an embodiment of the present invention.
Figure 4:
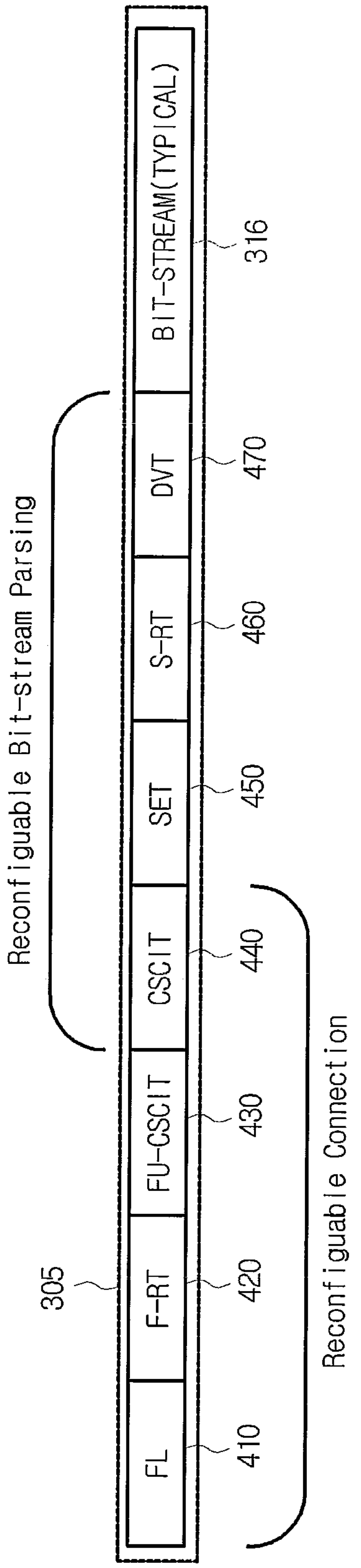
FIG. 4 shows a brief structure of an extended bitstream in accordance with an embodiment of the present invention.

FIG. 3 shows a brief structure of a decoder in accordance with an embodiment of the present invention, and FIG. 4 shows a brief structure of an extended bitstream in accordance with an embodiment of the present invention.

As described in FIG. 3, the decoder 300 of the present invention has a different structure from the conventional decoder (refer to FIG. 1).

In other words, a decoder description and a bitstream are provided to the decoder 300 in order to perform the encoding decoding method in accordance with an embodiment of the present invention. The decoder description as independent data of encoded video data can be provided to decoder 300. Alternatively, as shown in FIG. 3, an extended bitstream 305 in which the decoder description and the bitstream are integrated can be provided to the decoder 300. Of course, if information corresponding to the decoder description is prestored at a storing unit of the decoder 300, providing the decoder description can be omitted. The below description focuses on the case that the pertinent data is included in the extended bitstream before being provided to the decoder 300.

In accordance with an embodiment of the present invention, the decoder 300 can include a dividing unit 310 and a decoding processing unit 320. Obviously, at least one of the elements of the decoder 300 (e.g. the dividing unit 310, the decoding processing unit 320, or at least one of elements of the decoding processing unit 320) can be realized as a software program (or a combination of program codes), which is designed to perform a below-described function.

The dividing unit divides the inputted extended bitstream 305 into an encoded decoder description 313 and a typical bitstream 316 (hereinafter, referred to as "conventional bitstream") and inputs each of them into the decoding processing unit.

The dividing unit 310 can input the encoded decoder description 313 into a description decoder 505 and the conventional bitstream 316 into a decoder forming 520. As described above, if the encoded decoder description 313 and the conventional bitstream 316 are inputted as each independent data, the dividing unit 310 can be omitted. Here, the conventional bitstream 316 can have the identical or similar format to the bitstream 105 of FIG. 1.

An example of the extended bitstream 305 is shown in FIG. 4. Referring to FIG. 4, the extended bitstream 305 can include the encoded decoder description 313 and the conventional bitstream 316. FIG. 4 showing the extended bitstream 305 and the encoded decoder description 313 is only for the convenience of description and understanding. It is obvious that the extended bitstream 305 and the encoded decoder description 313 of the present invention are not limited to the example of FIG. 4.

A decoder description 590 generated by allowing the encoded decoder description 313 to be decoding-processed by the description decoder 505 includes configuration information of the conventional bitstream 316 and information related to the encoding type of the conventional bitstream 316 (or connection information between the functional units) and the measurement of input or output data of a functional unit. The decoder description 590 can be written by using a technical method such as a textual description or a binary description. Of course, if the encoded decoder description 316 is realized to be recognized by the decoder forming unit 520 without the processing of the description decoder 505, the description decoder 505 can be omitted.

The decoder description 590 can be divided into partial decoder descriptions such as a functional unit list (FL) 410, a functional unit rule table (F-RT) 420, a functional unit CSCIT (FU-CSCIT) 430, a control signal and context information table (CSCIT) 440, a syntax element table (SET) 450, a syntax-rule table (S-RT) 460 and a default value table (DVT) 470 before being stored in a description storing unit 510. It is obvious that each partial decoder description constituting the decoder description can have various changeable sequences.

Here, the FL 410, the F-RT 420, the FU-CSCIT 430 and the CSCIT 440 can be used to set the connection of each functional unit (the pertinent partial decoder descriptions can be referred to as "a first decoder description" as necessary).

The FU-CSCIT 440 may be a partial decoder description for mapping between each functional unit of the toolbox (515) (i.e. the functional unit for the decoding processing) and element information stored in the CSCI storing unit 532. In this case, the element information can function as a control variable for each functional unit of the toolbox 515 (i.e. the functional unit for the decoding processing or/and the functional unit for the syntax parsing).

Also, the CSCIT 440, the SET 450, the S-RT 460 and the DVT 470 can be used for the parsing of the conventional bitstream 316 (the pertinent partial decoder descriptions can be referred to as “a second decoder description” as necessary). The forms and functions of each partial decoder description will be described later in detail.

The description decoder 505 generates the decoder description 314 by decoding the encoded decoder description inputted from the dividing unit 310. Then, the description decoder 505 divides the decoder description 314 into a plurality of partial decoder descriptions in a form capable of being recognized by the decoding forming unit 530 (or the decoding solution 530) and stores the partial decoder description in the description storing unit 510.

Each partial decoder description to be stored at the description storing unit 510 is unnecessary to be a typical table. It is sufficient that the partial decoder descriptions can be recognized by the decoding forming unit 530 (or the decoding solution 530).

The partial decoder descriptions such as the FL 410, the F-RT 420, the FU-CSCIT 430, the CSCIT 440, the SET 450, the S-RT 460 and the DVT 470 can be stored at the description storing unit 510 by the decoder description analysis of the description decoder 505.

For example, the description decoder 505 can distinguish each partial decoder description by referring to table identifiers included in the areas showing each of the partial decoder description. It is unnecessary that the decoder description 590 includes information corresponding to all partial decoder descriptions. The decoder description 590 can include a codec number and a profile and level number. Alternatively, decoder description 590 can include codec numbers and profile and level numbers for only some of the partial decoder descriptions.

In the case of including the codec number and the profile and level number, the description decoder 505 can select a corresponding partial decoder description to be used in the decoding from the partial decoder descriptions pre-stored at the description storing unit 510, instead of generating a new partial decoded description for all partial decoder descriptions or some of the partial decoder descriptions. Also, in the case of including the codec number, the profile and level number and correction information, the description decoder 505 can extract a partial decoder description corresponding to a pertinent codec from the partial decoder descriptions pre-stored at the description storing unit 510 and generate a new partial decoder description by applying the correction information. Of course, in the case of including a table description for generating the partial decoder description instead of the codec number and the profile and level number, the description decoder 505 can generate a new partial decoder description to be used in the decoding for all partial decoder descriptions or some of the partial decoder descriptions.

Figure 5:
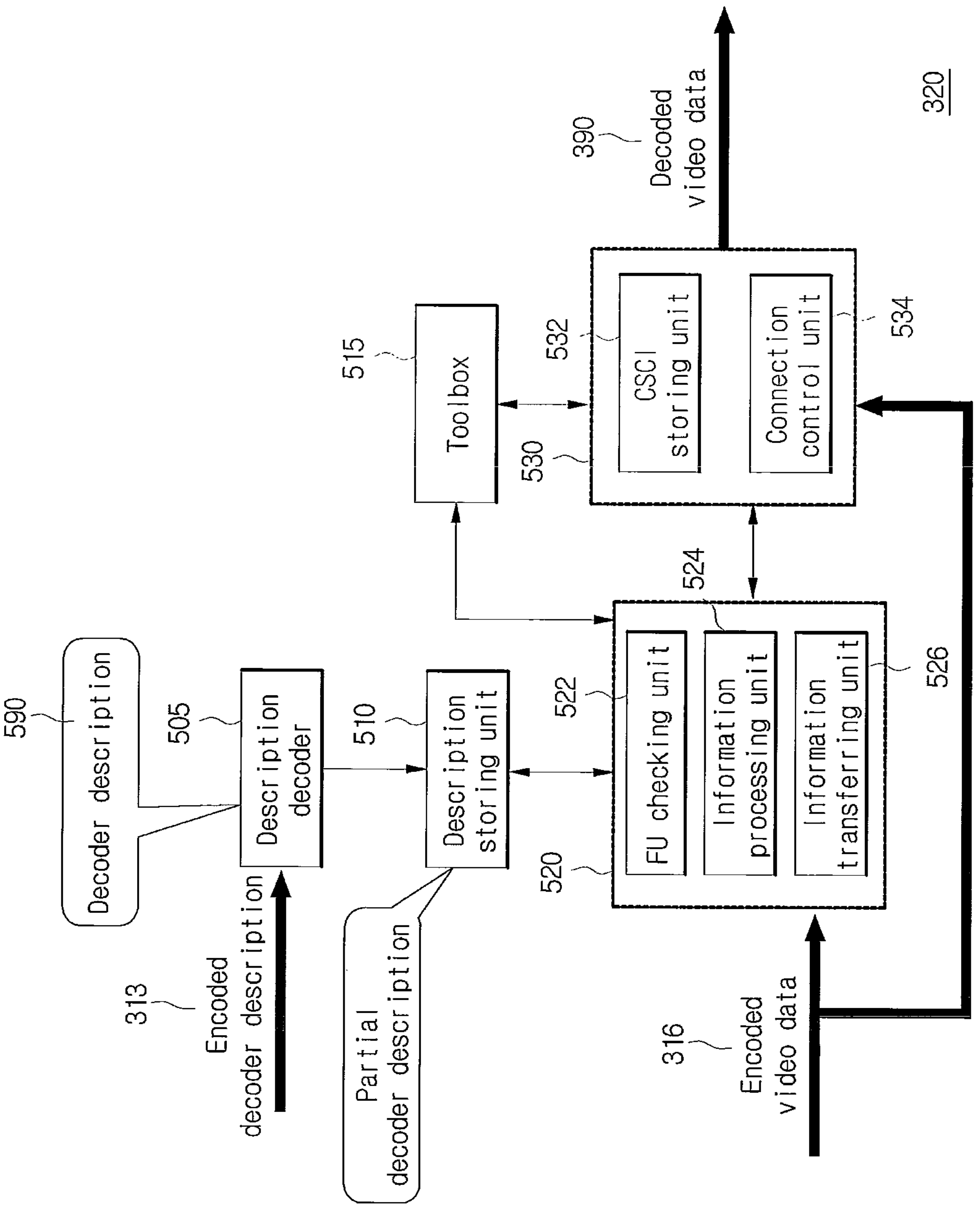
FIG. 5 shows a brief structure of a decoding processing unit in accordance with a first embodiment of the present invention.
Figure 6:
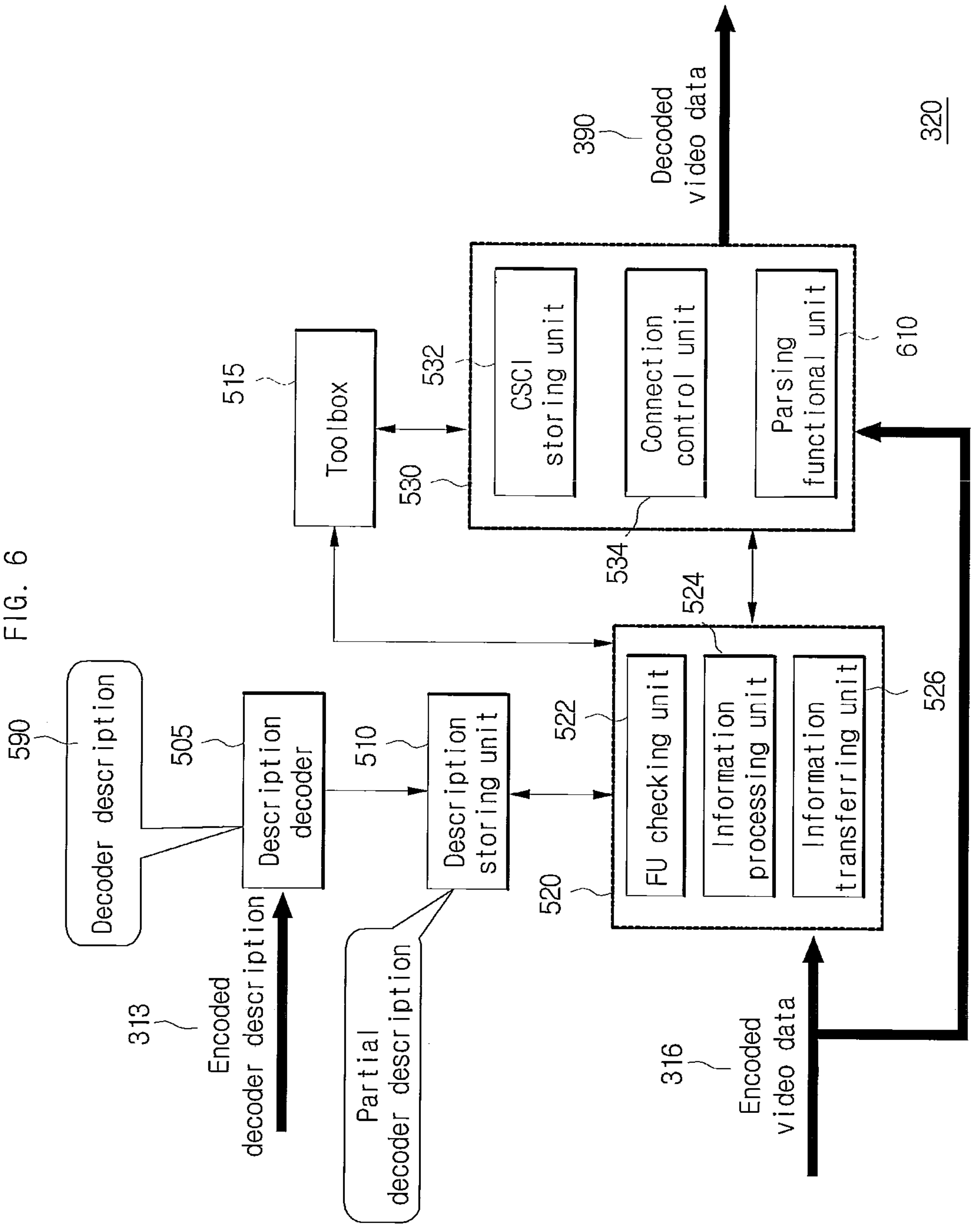
FIG. 6 shows a brief structure of a decoding processing unit in accordance with a second embodiment of the present invention.
Figure 7:
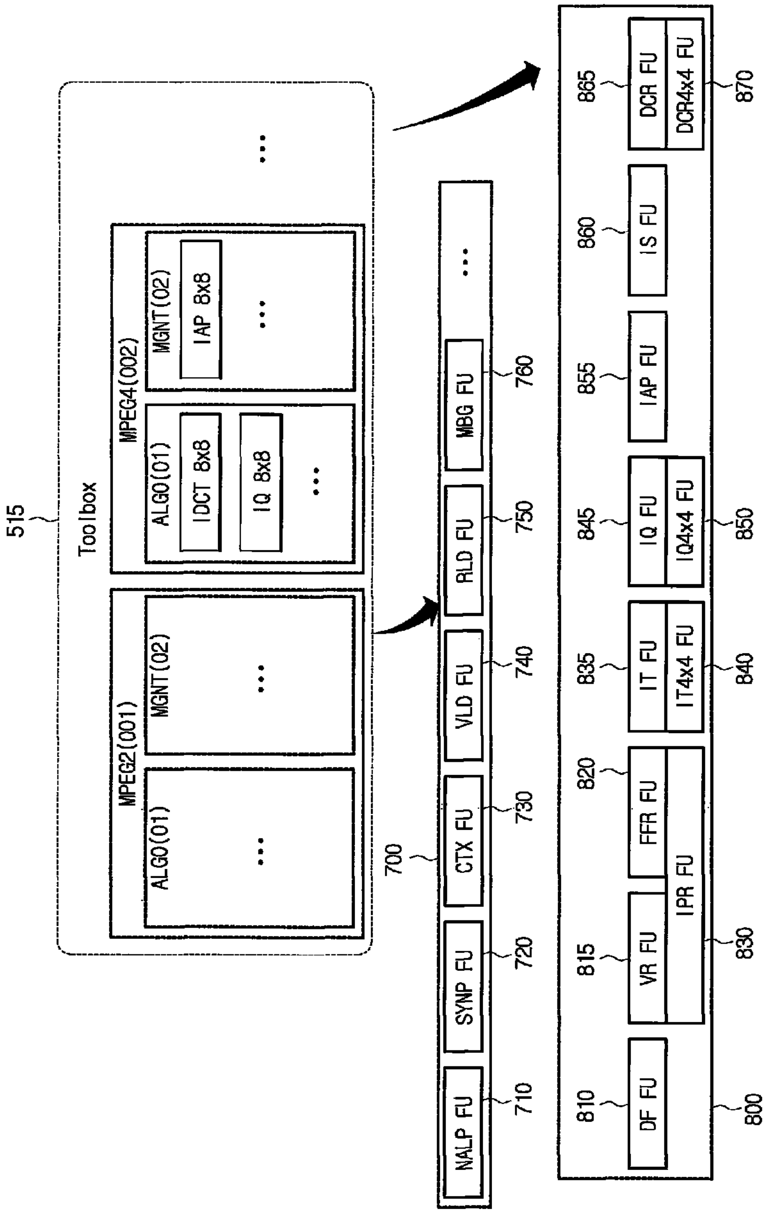
FIG. 7 shows the structure of a toolbox in accordance with an embodiment of the present invention.

FIG. 5 shows a brief structure of a decoding processing unit in accordance with a first embodiment of the present invention, and FIG. 6 shows a brief structure of a decoding processing unit in accordance with a second embodiment of the present invention. FIG. 7 shows the structure of a toolbox in accordance with an embodiment of the present invention, and FIG. 8 is an example showing how functional units (FU name) are distinguished in accordance with an embodiment of the present invention.

FIG. 5 and FIG. 6 show each embodiment of a decoding processing unit 320.

Referring to FIG. 5 showing a first embodiment of the decoding processing unit 320, the decoding processing unit 320 can include a description decoder 505, a description storing unit 510 a toolbox 515, a decoder forming unit 520 and a decoding solution 530.

The decoder forming unit 520 includes a FU checking unit 522, an information processing unit 524 and an information transferring unit 526.

If the partial decoder descriptions are stored by the processing of the description decoder 505, the FU checking unit 522 checks whether the toolbox 515 includes all functional units written in the partial decoder descriptions (e.g. the FL 410). If the toolbox 515 does not include all functional units written in the partial decoder descriptions, an error message can be displayed through a display apparatus or a user can be requested to update the pertinent functional unit. Of course, in the case of a server apparatus for updating the pertinent functional unit through a communication network, the functional unit 522 can execute an automatical update through the communication network.

The information processing unit 524 classifies each partial decoder description according to its function and processes the classified partial decoder descriptions in a data form capable of being easily operated by the decoding solution 530. This is because the partial decoder descriptions may be stored at the description storing unit 510 in a format (e.g. a table format) which is unsuitable for the decoding solution 530 to use or it is may be necessary to need the information which the decoding solution 530 will use more effectually.

Since the function and format will be described in detail later with reference to the related drawings, below is briefly described the form of the processed data.

The information processing unit 524 classifies each partial decoder description according to whether the partial decoder descriptions are used for the generation or storage of control signal/context information (CSCI) or the connection of the functional units. Then, the information processing unit 524 processes CSCI control information and the connection control information. For example, the partial decoder descriptions such as the SET 450, the S-RT 460, the CSCIT 440 and the DVT 470 can be used to generate the CSCI control information, and the partial decoder descriptions such as the FL 410, the F-RT 420, the S-RT 460 and FU-CSCIT 430 and the DVT 470 can be used to generate the connection control information.

For example, the CSCI control information or the connection control information processed by the information processing unit 524 can be expressed in an XML based abstract decoder model (ADM) type. Below are examples of the CSCI control information and the connection control information. Of course, this is not limited to the type of expressing the CSCI control information and the connection control information Firstly, the CSCI control information can be expressed as follows.

```
<CSCIs>
  <csci_memory id=“C0” name=“CSCI #0” type=“integer” />
  <csci_memory id=“C1” name=“CSCI #1” type=“integer” />
  <csci_memory id=“C2” name=“CSCI #2” type=“array” />
  <csci_memory id=“C3” name=“CSCI #3” type=“integer” />
  <csci_memory id=“C4” name=“CSCI #4” type=“integer” />
  <csci_memory id=“C5” name=“CSCI #5” type=“integer” />
  <csci_memory id=“C6” name=“CSCI #6” type=“integer” />
  <csci_memory id=“C7” name=“CSCI #7” type=“integer” />
  <csci_memory id=“C8” name=“CSCI #8” type=“integer” />
  <csci_memory id=“C9” name=“CSCI #9” type=“integer” />
  <csci_memory id=“C10” name=“CSCI #10” type=“integer” />
  <csci_memory id=“C11” name=“CSCI #11” type=“integer” />
  <csci_memory id=“C12” name=“CSCI #12” type=“integer” />
  ......
</CSCI>
```

Next, the connection control information can be expressed as follows.

```
<Network name="Decoder">
<Package>
<QID>
<ID id="MPEG4 Simple Profile" />
</QID>
</Package>
<Port kind="Input" name="BITSTREAM" />
<Port kind="Ouput" name="YUV" />
<Instance id="1">
<Class name="Parser">
<QID>
<ID id="c" />
</QID>
</Class>
<Note kind="label" name="Stream Parser" />
</Instance>
<Instance id="2">
<Class name="VS">
<QID>
<ID id="c" />
</QID>
<Note kind="label" name="Video Session" />
</Class>
</Instance>
<Connection src="" src-port="BITSTREAM" dst="1" dst-
port="BITSTREAM" />
<Connection src="1" src-port="CSCI" dst="2" dst-port="CSCI" />
<Connection src="1" src-port="DATA" dst="2" dst-port="DATA" />
<Connection src="2" src-port="YUV" dst="" dst-port="YUV" />
</Network>
```

The information transferring unit 526 can transfer the CSCI control information and the connection control information, processed by the information processing unit 524, to the decoding solution 530. In particular, the information transferring unit 526 can transfer the CSCI control information to the CSCI storing unit 532, which actually store and use the CSCI control information, and the connection control information to a connection control unit 534, which controls the connection between each functional unit. If the CSCI storing unit 532 functions to store the CSCI control information and using the CSCI control information is performed by the connection control unit 534, the information transferring unit 526 can obviously transfer the CSCI control information and the connection control information to the connection control unit 534.

The decoding solution 530 includes the CSCI storing unit 532 and the connection control unit 534. The decoder solution 530 further includes at least one working memory, for allowing at least one of functional unit to be loaded and a predetermined process to be performed by the call of the connection control unit 534.

Referring to FIG. 6 in which a second embodiment of the decoding processing unit 320 is shown, the decoding processing unit 320 can include the description decoder 505, the description storing unit 510, the toolbox 515, the decoder forming unit 520 and the decoding solution 530.

As compared with FIG. 5, the decoding solution 530 of the decoding processing unit 320 of FIG. 6 can further include a parsing functional unit. The parsing functional unit 610 performs the syntax-parsing of a bitstream. The parsing functional unit 610 can be included at the decoding solution 530 as an independent element. Alternatively, it is obvious that the same effect can appear by allowing the decoding solution 530 to include two working memories and the connection control unit 534 to control the functional units for the decoding processing only to be dedicatedly loaded onto one of the two working memories and the parsing functional unit 610 only to dedicatedly be loaded onto the other. In all cases, it is possible to perform the parsing operation and decoding operation of a bitstream successively or/and in parallel.

Also, as compared with FIG. 5, the information processing unit 524 additionally process syntax parsing control information and provides the additionally processed information to the decoding solution 530. This may cause the functions of the partial decoder descriptions, used to generate the CSCI control information, the connection control information and the syntax parsing control information, to be changed.

In other words, the information processing unit 524 classifies each partial decoder description according to whether the partial decoder descriptions are used for the generation or storage of control signal/context information (CSCI), the syntax parsing or the connection of the functional units. Then, the information processing unit 524 processes the CSCI control information, the connection control information and the syntax parsing control information. For example, the partial decoder descriptions such as the CSCIT 440 can be used to generate the CSCI control information, and the partial decoder descriptions such as the FL 410, the F-RT 420 and FU-CSCIT 430. The partial decoder descriptions such as the SET 450, S-RT 460, the CSCIT 440 and the DVT 470 can be used to generate the syntax parsing control information.

As described above, the CSCI control information or the connection control information processed by the information processing unit 524 can be expressed in an XML based abstract decoder model (ADM) type. Below is an example of the syntax parsing control information.

```
<syntax>
  <syntax_element id="S0" name="Syntax #0">
    <process>
      <cmd type="READ">
        <parameter index=0>32</parameter>
        <parameter index=1>B</parameter>
      </cmd>
      <cmd type="EXPRESSION">
<parameter index=0>(C0=(IBS==HEX:1B0))</parameter>
      </cmd>
    </process>
  </syntax_element>
  <syntax_element id="S1" name="Syntax #1">
    <process>
      <cmd type="READ">
        <parameter index=0>8</parameter>
        <output type="CSCI">C1</output>
      </cmd>
    </process>
  </syntax_element>
  (......)
</syntax>
```

The information transferring unit 526 can transfer the CSCI control information, the connection control information and the syntax parsing control information, processed by the information processing unit 524, to the decoding solution 530. In particular, the information transferring unit 526 can transfer the CSCI control information to the CSCI storing unit 532, which actually store and operate the CSCI control information, the connection control information to a connection controlling unit 534, which controls the connection between each functional unit, and the syntax parsing control information to the parsing functional unit 610. If the CSCI storing unit 532 functions to store the CSCI control information and using the CSCI control information is performed by the connection control unit 534, the information transferring unit 526 can obviously transfer the CSCI control information and the connection control information to the connection control unit 534. Also, if the parsing functional unit 610 performs the syntax parsing of a bitstream by the control of the connection control unit 534, the information transferring unit 526 can obviously transfer the syntax parsing control information to the connection control unit 534.

The decoding solution 530 includes the CSCI storing unit 532, the connection control unit 534 and the parsing functional unit 610. The decoder solution 530 further includes at least one working memory, for allowing at least one of functional unit to be loaded and a predetermined process to be performed by the call of the connection control unit 534.

The parsing functional unit 610 can be a functional unit capable of performing the syntax parsing of all bitstreams regardless of formats of encoding the bitstreams or a functional unit particularly generated for the syntax parsing of a type of bitstream. In other words, the parsing functional unit 610 as at least one of functional unit for performing the syntax parsing will be described in detail with reference to the related drawings.

As shown in FIG. 5 and FIG. 6, the decoder 300 of the present invention can be re-combined or generated in various forms such that an inputted bitstream can be decoded regardless of encoded formats, by allowing the functional units of the toolbox 515 (i.e. the decoding functional unit performing the decoding process or/and the parsing functional unit 610 performing the syntax parsing) to be selectively loaded and to be decoded.

As described above, the decoder forming unit 520 (or the connection control unit 534) forms a decoder for processing an inputted bitstream, and decoding the bitstream is performed by an actual decoder, formed by the control of the decoder forming unit 520 (or the connection control unit 534), which is the decoding solution 530. As a result, dividing two processing units having the functional casual relationship with each other makes it possible to make a plurality of decoding solutions by using one decoder formation information, to thereby allow the decoder to perform more efficient processing.

Hereinafter, the function and operation of each element of the decoding processing unit 320 of FIG. 5 or/and FIG. 6 will be described with reference to the related drawings.

The description decoder 505, as described above, decodes the inputted encoded decoder description 313 to the decoder description 590. Then, the description decoder 505 allows a plurality of partial decoder descriptions to be stored at the description storing unit 510.

The toolbox 510 includes a plurality of functional units, respectively, realized to perform a predetermined process. Here, the parsing functional unit 610, which is realized as one functional unit or a combination of a plurality of functional units, can be included at the toolbox 515 or the decoding solution 530. Alternatively, the parsing unit and each functional unit can be realized as a combination of each program code.

Each functional unit of the toolbox 510 can be segmentalized into a plurality of subtoolboxes divided by using each applied usage set (referring to FIG. 7). For example, each functional unit can be segmentalized into a first toolbox including the functional unit for MPEG and a second toolbox including other functional units. Alternatively, each functional unit can be segmentalized into a first toolbox as a set of the functional units for MPEG-2, a second toolbox as a set of the functional units for MPEG-4 and a third toolbox as a set of the functional units for AVS, which is a digital TV compression standard in China.

Of course, a plurality of toolboxes 510 can have an independent connection relationship with the decoder forming unit 520 and the decoding solution 530. In this case, the toolboxes 510 can be realized as the foregoing independent toolboxes such as the first toolbox and the second toolbox, which are not shown.

For the convenience of describing, the below description focuses on the case that one toolbox 510 includes a plurality of subtoolboxes.

The toolbox 510 includes the functional units realized to perform each function (i.e. a predetermined process). Each functional unit forms successive connecting operation relationships by being loaded onto the working memory by the connection control of the connection control unit 534, to thereby output the encoded video data included in the conventional bitstream 316 to video data.

As described with reference to FIG. 6, the parsing functional unit 610 can be set to analyze the conventional bitstream 316 without the connection control of the connection control unit 534 by being included at the decoding solution 530 and using the syntax parsing control information. This is because following functional units can use element information, which the parsing functional unit 610 analyzes and stores at the CSCI storing unit 532, and/or video data of macroblock size, which is outputted from the parsing functional unit 610.

The parsing functional unit 610 stores element information as the result of the syntax parsing at the CSCI storing unit 532 by analyzing the inputted conventional bitstream 316 by use of the syntax parsing control information. The CSCI storing unit 532 can employ a buffer memory, for example. The element information can be control signal/context information, for example. The element information, which is parsed by the parsing functional unit 610 and stored at the CSCI storing unit 532, can be a parsing-result value of a pertinent step and simultaneously an input value of determining a following syntax of the conventional bitstream 316.

Also, the parsing functional unit 610 can output video data of a predetermined macroblock size to a following functional unit according to the connection control of the connection control unit 534 by performing the entropy decoding of the syntax-parsed conventional bitstream 316's header and video data.

Of course, the parsing functional unit 610 can store the video data of the macroblock size at a predetermined buffer memory, and a following functional unit according to the load (i.e. the connection control) of the connection control unit 534 can read the video data of the macroblock size from the pertinent buffer memory to process the read video data. Then, the parsing functional unit 610 can store the processed video data at the pertinent buffer memory, for the processing of a following functional unit.

In other words, the parsing functional unit 610 can obviously store the video data of the macroblock size at the CSCI storing unit 532 or a buffer memory before the connection control unit 534 provides the stored video data of the macroblock size to a selected functional unit or the selected functional unit reads the video data from the CSCI storing unit 532 or the buffer memory. The below description assumes that the video data of the macroblock size outputted by the parsing functional unit 610 is directly inputted into a functional unit according to the connection control of the connection control unit 534.

The parsing functional unit 610 can be realized as one software program (including a combination of program codes). This is because even if the parsing functional unit 610 is realized to perform a plurality of functions corresponding to a plurality of standards (e.g. MPEG-1/2/4/AVC and AVS), respectively, it is possible to perform a corresponding operation by using the syntax parsing control information. Of course, the parsing functional unit 610, as shown in FIG. 7, can be realized by being segmentalized into a plurality of functional units or as a combination of program codes into which each functional unit is blocked.

Hereinafter, the functional units of the toolbox 515 will be briefly described with reference to FIG. 7 and FIG. 8.

As shown in FIG. 7, each functional unit of the toolbox 510 can be segmentalized into a plurality of subtoolboxes divided by using each applied usage set. Of course, a plurality of toolboxes can be realized to have an independent connection relationship with the decoder forming unit 520 and the decoding solution 530.

The first description is related to the function of a parsing functional unit performing a parsing function among each functional unit of FIG. 7, which is the functional unit divided per each function. As described above, the parsing functional unit can be operated by being included at the toolbox 515 and loaded by the control of the connection control unit 534 or by being included at the decoding solution 530.

The parsing functional unit divided per each function, as shown in FIG. 7, can include a network abstraction layer parsing (NALP) functional unit 710, a syntax parsing (SYNP) functional unit 720, a context determination (CTX) functional unit 730, a variable length decoding (VLD) functional unit 740, a run length decoding functional unit 750 and a macroblock generator (MBG) functional unit 760.

It is obvious that the parsing functional unit can include any functional unit for performing the syntax parsing regardless of an applied standard, a necessary functional unit for performing the syntax parsing can be added, an existing functional unit can be modified and an unnecessary functional unit can be deleted. It is obviously possible to combine the functional units that are commonly applicable by a plurality of standards among each functional unit included at the parsing functional unit. Below is briefly described each function of the functional units which is evident to any person of ordinary skill in the alt.

The NALP functional unit 710 parses a network abstraction layer (NAL) of MPEG-4 AVC, the SYNP functional unit 720 parses the syntax of a bitstream. The SYNP functional unit can be included at the VLD functional unit 740.

The CTX functional unit 730 determines a VLC table of MPEG-4 AVC, and the VLD functional unit 740 performs the entropy decoding.

The RLD functional unit 750 performs the entropy decoding of AC values, and the MBG functional unit 760 combines DC values and AC values to generate one macroblock datum. The VLD functional unit can perform the functions of all or some of the functional units, included at the aforementioned parsing functional unit 610, according to each system realizing type.

As described above, the parsing functional unit can be realized as one software program or a plurality of software programs (e.g. the VLD functional unit can be independently realized as an independent software program). The operation which the parsing functional unit extracts or generates element information by using syntax parsing control information and stores the extracted or generated element information at the CSCI storing unit 532.

The next description is related to the function of a parsing functional unit performing a parsing function among each functional unit of FIG. 7, which is the functional unit divided per each function.

The decoding units included at the toolbox 515 decodes video data in units of macroblock, outputted (or stored at the buffer memory) by the parsing functional unit, and outputs the decoded video data having a predetermined size by being activated by the selective load of the connection control unit 534 and performing each predetermined process.

The toolbox 515 can include functional units for performing the foregoing functions according to each standard. Each function can be realized as an independent processing block (e.g. a software program, a combination of command codes and a function) or one integrated processing block. Although the decoding units are realized as one integrated processing block, the corresponding processing can be obviously performed by the connection control of the connection control unit 534.

The decoding functional units can be a de-blocking filtering (DF) functional unit 810, a VOP reconstructing (VR) functional unit 815, a frame field reordering (FFR) functional unit 820, an intra prediction and picture reconstruction (IPR) functional unit 830, an inverse transform (IT) functional unit 835, an inverse quantization (IQ) functional unit 845, an inverse AC prediction (IAP) functional unit 855, an inverse scanning (IS) functional unit 860 and a DC reconstruction (DCR) functional unit 865.

An IT 4×4 functional unit 840, an IQ 4×4 functional unit 850 and a DCR 4×4 functional unit 870 process the blocks having the size of 4×4. This is because although MPEG-1/2/4 process data in 8×8 block size in the transform, quantization and prediction, MPEG-4 AVC may process data in 4×4 block size.

It is obvious that the toolbox 515 can include any functional unit for performing a data decoding function regardless of an applied standard, a necessary functional unit for the developed technology can be added, an existing functional unit can be modified and an unnecessary functional unit can be deleted. For example, in the case of additionally needing the IS functional unit processing data in 4×4 block size to perform the decoding, the pertinent functional units can be included at the toolbox 515. Also, a special prediction (SPR) functional unit (not shown) can be added to perform the intra prediction for the MPEG-4 AVC.

It is obviously possible to combine the functional units that are commonly applicable by a plurality of standards among each functional unit of the toolbox 515. Below is briefly described each function of the functional units which is evident to any person of ordinary skill in the art.

The DF functional unit 810 is a de-blocking filter of MPEG-4 AVC, and the VR functional unit 815 stores a decoded pixel value.

The FFR functional unit 820 is for an interlaced mode, and the IPR functional unit 830 performs the intra prediction of MPEG-4AVC and then stores a decoded pixel value. As described above, the intra prediction of MPEG-4 AVC can be performed by the SPR functional unit.

The IT functional unit 835 performs the inverse transform of DC values and AC values, and the IQ functional unit 845 performs the inverse quantization of the AC values.

The IAP functional unit 855 performs the inverse AC prediction of the AC values, and the IS functional unit 860 performs the inverse scan of the AC values. The DCR functional unit 865 performs the inverse AC prediction and the inverse quantization of the DC values.

Each functional unit of FIG. 7 is named in a board sense according to the distinguishment per function. In accordance with the present invention, as shown in FIG. 8, the functional unit having the board-sense name can be realized to include functional units segmentalized per each usage. For example, an IT functional unit can be segmentalized into an IT 4×4 functional unit, an IT 8×8 functional unit and an ITforChroma, and the IQ functional unit can be segmentalized into a quantization functional unit and a saturation functional unit. In particular, the IS functional unit 860 can be segmentalized into a plurality of functional units such as MPEG4.algo.IS.luma.8×8, MPEG4.algo.IS.chroma.8×8 and MPEG4.mgnt.IS. The IT functional unit 835 can be segmentalized into a plurality of functional units such as MPEG2.algo.IT.luma.8×8, MPEG4.algo.IT.luma.8×8 and MPEG4AVC.algo.IT.luma.4×4. Also, the IQ functional unit can be segmentalized into a plurality of functional units such as MPEG2.algo.quan.luma.8×8 and MPEG2.algo.satu.luma.8×8.

As described above, the functional unit ID or/and nomenclature of the following table 1 and table 2 can be applied in order to diversify the functional units and distinguish the functional units by using sub-functional units. Of course, the present invention is not limited to the tables 1 and 2.

In the toolbox 515, each functional unit is expressed as a group in a board sense according to the allotted name per function. In other words, if it is assumed that there is at least one functional unit that performs the same function with different performance method, it is possible to bind up the functional units performing the same function into one group. This is because using ID or name makes it possible to more quickly access the pertinent functional unit. As an embodiment of forming ID, it is possible to allot corresponding bits according to a name forming method as shown in table 1 and 2. It is possible to form a basic ID as {STANDARD}.{Role}.{Name}, which is essential inserting elements for forming the functional unit name, and to give flags to the other additional elements.

TABLE 1

| Bits allotted to display functional unit's name | | | | | |
|---|---|---|---|---|---|
| Standard | Role | Name | Size | Other Flag | Other Contents |
| 3 bits | 2 bits | 8 bits | 3 bits | 2 bits | N bits |

Besides, it is obviously possible to further include a field for showing whether the pertinent functional unit is to provide luminance or chrominance, as shown in FIG. 8.

In other words, the bits for displaying the functional unit names can be allotted in various ways according to the functional unit nomenclature.

In accordance with another embodiment of the present invention, the functional unit nomenclature can be applied as {STANDARD}.[list].{Role}.{Name}.[property].[size].[implementation].

Here, {STANDARD} is to indicate a decoding standard to which the pertinent functional unit is applied. For example, if the pertinent functional unit can be applied to at least two standards, the pertinent functional unit corresponds to GENERIC, and if the pertinent functional unit is applied to a certain standard, the pertinent functional unit corresponds to the certain standard.

If the pertinent functional unit can be universally applied to at least two standards, [list] is to indicate it. For example, if the functional unit is universally applied to MPEG-2, 4 and AVC, the functional unit can be expressed as GENERIC.24avc.algo.Interpolation.halfpel.

{Role} is to indicate information related to whether the functional unit performs an algorithm, and {Name} is to indicate a name corresponding to the processing operation of the functional unit.

[Property] is to indicate a designated property or specifically designated process of the pertinent functional unit. For example, if the name of the functional unit is designated as GENERIC.24avc.Interpolation.halfpel, "halfpel" is to indicate the property. This is to indicate that the interpolation is performed by computing up to ½ pixel.

[Size] refers to the size of a macroblock that the pertinent functional unit processes.

[Implementation] is to indicate additional information for the execution of the pertinent functional unit.

TABLE 2

| Functional unit ID or/and Nomenclature | | | |
|---|---|---|---|
| Field | Name | ID | Remark |
| Standard | MPEG2 | 001 | |
| | MPEG4 | 002 | |
| | . . . | . . . | |
| Role | Algo | 01 | Algorithm, functional unit for processing data |
| | Mgnt | 02 | Management, functional unit for managing data |
| | . . . | . . . | |
| Name | Address | 00010100 | |
| | IAP | 00010101 | |
| | IDCT | 00010111 | |
| | . . . | . . . | |
| Size | 16x16 | 001 | |
| | 8x8 | 002 | |
| | . . . | . . . | |
| . . . | . . . | . . . | . . . |

As described above, it is possible to manage each functional unit, which is bound up according to an upper group, by giving specifically designated ID or/and name to each functional unit. In other words, as shown in FIG. 7, each functional unit can be grouped per standard. Then, the functional units included at each standard can be managed by determining whether the functional units are algorithm or management.

Also, it is unnecessary that the processing operation between the above-described parsing functional unit and decoding functional unit is successively performed (i.e. the operation of the parsing functional unit is completed before the decoding functional unit starts to be operated). It is obviously possible to perform the parallel processing by allowing two functional units to be loaded onto a working memory by the connection control of the connection control unit 534. This is because it is sufficient to allow only minimum element information necessary for the operation of a particular decoding functional unit to be stored at the CSCI storing unit 532 by the parsing functional unit.

As described with reference to FIG. 6, if the parsing functional unit or at least two working memories are equipped at the decoding solution 530, although the pertinent description is omitted, it is obviously possible to perform the syntax parsing and decoding processing in parallel without additional control of the connection control unit 534.

The CSCI storing unit 532 stores element information (e.g. CSCI), which is the result value by the syntax parsing that the parsing functional unit performs by using CSCI control information (or syntax parsing control information), to correspond to the CSCIT 440. For example, the CSCI storing unit 532 can be a buffer memory.

The element information stored at the CSCI storing unit 532 can be used as input data for performing a process of the SET 450 by the parsing functional unit or as a control variable for determining a following connection index in the S-RT 460.

The element information stored at the CSCI storing unit 532 can be also used as a control variable for determining a following connection index in the F-RT 420 by the connection control unit 534 or used to allow an input CSCI of a functional unit to map to element information, stored at the CSCI storing unit 532, in the FU-CSCIT 430.

In other words, the element information stored at the CSCI storing unit 532 links the parsing functional unit with the decoding functional units.

The connection control unit 534 sets the connection of each decoding functional unit in order to decode a bitstream encoded by various standards through the control of the selective load of each functional unit. In other words, the connection control unit 534 selectively load a suitable functional unit of each functional unit included at the toolbox 515 in order to control an operation performing order. Herein, the connection control unit 534 selectively loads pertinent functional units by using connection control information and allows the loaded functional units of the decoding functional units to decode video data in units of macroblock by using the element information provided by the parsing functional unit.

Hereinafter, the functions and uses of each partial decoder description will be described based on the operation of the information processing unit 524 of the decoder forming unit 520 with reference to the related drawings. Although the connection control unit 534 performs the processing by using the information processed by the information processing unit 524, this will be described by referring to the details of the partial decoder description for the convenience of description and understanding.

The information processing unit 524 generates the connection control information by using the partial decoder descriptions such as the FL 410, the F-RT 420, the FU-CSCIT 430 and the CSCIT 440. Also, it is possible to further use the S-RT 460 in order to set the connection of each functional unit for the syntax parsing.

Firstly, a FU list (FL) 410, as shown in table 3, refers to the partial decoder description related to the toolbox ID including each functional unit of the toolbox 515, IDs and names of the pertinent functional units and the number of input and output data of the pertinent functional units.

TABLE 3

| FL(FU List) Tool-Box | | | | |
|---|---|---|---|---|
| ID | FU ID | FU name | Input CSCI | Output CSCI |
| 0A | F0092 | MPEG4.mgnt.Address.16x16 | 4 | 0 |
| 0A | F0098 | MPEG4.mgnt.Address.8x8 | 2 | 0 |
| 0B | F0190 | AVS.algo.IDCT.8x8 | 2 | 0 |
| . . . | . . . | . . . | . . . | . . . |

The FL 410 can further include a buffer memory name of data inputted into each functional unit (or an address in which pertinent data is written or an address of a buffer memory in which pertinent data is written) and a buffer memory name of data outputted by the pertinent functional unit (or an address in which pertinent data is written or an address of a buffer memory in which pertinent data is written).

Accordingly, each functional unit can use the FL 410 in order to read and process input data and to write the corresponding output data. Also, information written at the FL 410 can be used in order to allow input and output data to be transferred to each functional unit or the connection control unit 534 can provide suitable input data to each functional unit.

However, in the FL 100, input data and output data of the parsing functional unit generating element information. This is because the parsing functional unit can use information such as the SET 450 in order to generate element information and to write the generated information at a designated position.

The particular functional unit loaded at the working memory by the connection control unit 534 receives input data from the connection control unit 534 and generates output data by performing a predetermined process. Here, the functional unit is included at the toolbox 515, and this refers to a series of processing operation that processes the input data by performing the predetermined process and generates the output data. The pertinent functional unit can store the output data at a buffer memory for the processing of a following functional unit (i.e. a functional unit subsequently loaded by the control of the connection control unit 534.

If it is sufficient that the decoding processing unit 320 uses only one standard to decode encoded video data included at the conventional bitstream 316, the FL 410 can include only information related to the functional units for performing a corresponding process of the pertinent standard.

However, in case that the pertinent video data is encoded by a plurality of standards (e.g. in the case of differently applying an encoding standard in units of a plurality of frames), information related to the functional units conforming to a plurality of standards to decode pertinent encoded video data will be necessary. Accordingly, in this case, the FL 410 is required to include the information related to the functional units conforming to a plurality of standards necessary to decode the encoded video data among all functional units conforming to a plurality of corresponding standards.

Of course, even though video data is differently applied with the encoded standard in units of a plurality of frames, if the plurality of conventional bitstreams 316 and extended bitstreams 305 are generated per applied encoded standard, each of the FL 410 can include the information related to the functional units conforming to each corresponding standard.

The FL 410 can be written in a technological method such as a textual description or a binary description (i.e. a bit-converted binary code form). The minimum necessary data of the partial decoder description can be written in a similar scripting language.

Next, the F-RT 420 provides connection information of the functional unit to be used to decode the inputted conventional bitstream 316.

The F-RT 420, as shown in table 4, includes an index (R#) indexing each connection information (Rule), a toolbox ID and a functional unit ID specifically determining the functional units according to the index, element information (input CS/CI, C#) necessary for the connection control, the number of branches (No. of branches) connectable to a following functional unit and each branch information (#1, #2 and #3 . . . ) necessary as many as the number of branches.

TABLE 4

| F-RT (FU Rule Table) | | | | | |
|---|---|---|---|---|---|
| Index | Tool-box ID | FU ID | Input CS/CI | No. of Branches | Branch information |
| R0 | 0A | F0092 | — | 1 | 1: GO R1; |
| R1 | 0A | F0098 | — | 1 | 1: GO R2; |
| R2 | 0B | F0190 | — | 1 | 1: GO R3; |
| . . . | . . . | . . . | . . . | . . . | . . . |

Since the index R0 of table 4 has the toolbox ID of 0A and the FU ID of F0092, the FL of the table 3 shows that the pertinent functional unit has the name of MPEG4.mgnt.Address.16×16.

The table 4 shows no necessary element information because the number of branches has 1 in all cases. However, if the number of branches is 2 or more, the necessary element information will be shown. The connection index will be changed according to the result of determining a conditional sentence using the necessary element information. In other words, if the number of branches is 1, there is no necessary element information and it proceeds to the connection index pointed by the branch information. After the pertinent conditional sentence, a following connection index (R) is shown.

If it is sufficient that the decoding processing unit 320 uses only one standard to decode encoded video data included at the conventional bitstream 316, the F-RT 420 can point to the connection of the functional units for performing a corresponding process of the pertinent standard.

However, if the pertinent video data is encoded by a plurality of standards (e.g. in the case of differently applying an encoding standard in units of a plurality of frames), the obvious thing is to include the information for designating the connection of the functional units conforming to a plurality of standards to decode pertinent encoded video data. If each partial decoder description, to be described below, needs additional information for being applied to a plurality of standards and/or amendments for being applied to a plurality of standards, it is obvious that pertinent information will be further included.

The F-RT 420 can be written in a technological method such as a textual description or a binary description (i.e. a bit-converted binary code form). The minimum necessary data of the partial decoder description can be written in a similar scripting language.

Next, the FU-CSCIT 430 is a partial decoder description for connecting element information stored at the CSCI storing unit 532 with the element information (input CSCI) necessary for each functional unit.

As shown in table 5, the FU-CSCIT 430 includes a toolbox ID, an index (F-C) which is arranged as a fair of the index of the FL 410 and element information, pertinent element information and an index (C) used for the mapping by the CSCIT 440. Besides, the FU-CSCIT 430 can further include a data type of element information. For example, the data type will be described in a form of 9-bit integer and 1-bit flag.

TABLE 5

| FU-CSCIT | | | |
|---|---|---|---|
| Tool-box ID | Index No. | CSCI information | CSCI table element |
| 0A | F0092-C1 | Quantiser_scale | C54 |
| 0A | F0092-C2 | CBP | C56 |
| 0A | F0092-C3 | Ac_pred_flag | C58 |
| 0A | F0092-C4 | The number of MB | C65 |
| 0A | F0098-C1 | CBP | C56 |
| 0A | F0098-C2 | Ac_pred_flag | C58 |
| . . . | . . . | . . . | . . . |

The FU-CSCIT 430 can be written in a technological method such as a textual description or a binary description (i.e. a bit-converted binary code form). The minimum necessary data of the partial decoder description can be written in a similar scripting language.

For example, 2 items of the element information of F0098 is inputted in the F-RT 420 (refer to table 5), the FU-CSCIT 430 lists the element information per functional unit. In other words, F0098-C1 and F0098-C2 are listed, and each of the element information is C56 and C58. Also, the pertinent element information is mapped by the CSCIT. Here, C56 and C58 can be recognized as the address in which each of the pertinent element information is stored (e.g. written address, a buffer memory name or a written address of a buffer memory). The pertinent functional unit can use element information corresponding to the input data and the index (c) in order to generate the output data and to output (or write at a buffer memory) the generated output data.

Finally, the CSCIT 440 writes details related to the element information (e.g. CSCI) as result information of a process using the SET 450 and S-RT 460. In other words, the CSCIT 440 is processed from the conventional bitstream 316 and stored at the CSCI storing unit 532. The CSCIT 440 also has information related to all meaningful data (i.e. element information) to be used by the decoding functional units.

As shown in FIG. 9, the CSCIT 440 includes an index (C) which is an identifier as an identification number of the pertinent element information, a flag, a name of pertinent element information (Element Name), an attribute for designating a data-structural property of pertinent element information (e.g. storage space size of the pertinent element information and determination whether the pertinent element information is an array type) and global/local indicating whether the pertinent element information is used in the syntax parsing operation only or in the overall decoding operation.

The CSCIT 440 can be written in a technological method such as a textual description or a binary description (i.e. a bit-converted binary code form). The minimum necessary data of the partial decoder description can be written in a similar scripting language.

Hitherto, the FL 410, the F-RT 420 and the FU-CSCIT 430 has been described with reference to table 3 through table 5.

Alternatively, the FL 410, the F-RT 420 and the FU-CSCIT 430 can be expressed in various ways. Below is each example of the various expressing methods.

Other Examples for Expressing the FL 410, the F-RT 420 and the FU-CSCIT 430

TABLE 6

| FL | | | |
|---|---|---|---|
| Tool-box ID + FU ID | FU name | input CSCI | output CSCI |
| 0A.F0092 | MPEG4.mgnt.Address.16x16 | 4 | 0 |
| 0A.F0098 | MPEG4.mgnt.Address.8x8 | 2 | 0 |
| 0B.F0190 | AVS.algo.IDCT.8x8 | 2 | 0 |
| . . . | . . . | . . . | . . . |

TABLE 7

| F-RT | | | | |
|---|---|---|---|---|
| Index | Tool-box ID + FU ID | Input CS/CI | No. of Branches | Branch information |
| R0 | 0A.F0092 | — | 1 | 1: GO R1; |
| R1 | 0A.F0098 | — | 1 | 1: GO R2; |
| R2 | 0B.F0190 | — | 1 | 1: GO R3; |
| . . . | . . . | . . . | . . . | . . . |

TABLE 8

| FU-CSCIT Index No. (Tool-box) | CSCI information | CSCI table element |
|---|---|---|
| 0A.F0092-C1 | Quantiser_scale | C54 |
| 0A.F0092-C2 | CBP | C56 |
| 0A.F0092-C3 | Ac_pred_flag | C58 |
| 0A.F0092-C4 | The number of MB | C65 |
| 0A.F0098-C1 | CBP | C56 |
| 0A.F0098-C2 | Ac_pred_flag | C58 |
| . . . | . . . | . . . |

Other Examples for Expressing the FL 410, the F-RT 420 and the FU-CSCIT 430

TABLE 9

| FL | | | | |
|---|---|---|---|---|
| FU name | input CSCI | output CSCI | Input data | Output data |
| MPEG4.mgnt.Address.16x16 | 4 | 0 | QFS | QFSP |
| MPEG4.mgnt.Address.8x8 | 2 | 0 | QFSP | PQF |
| MPEG4.algo.IAP.8x8 | 2 | 0 | PQF | QF |
| . . . | . . . | . . . | . . . | . . . |

TABLE 10

| F-RT | | | | |
|---|---|---|---|---|
| Index | FU | Input CS/CI | No. of Branches | Branch information |
| R0 | MPEG4.mgnt.Address.16x16 | — | 1 | 1: GO R1; |
| R1 | MPEG4.mgnt.Address.8x8 | — | 1 | 1: GO R2; |
| R2 | MPEG4.algo.IAP.8x8 | — | 1 | 1: GO R3; |
| . . . | . . . | . . . | . . . | . . . |

TABLE 11

| FU-CSCIT | | |
|---|---|---|
| Index No. | CSCI information | CSCI table element |
| MPEG4.mgnt.Address.16x16-C1 | Quantiser_scale | C54 |
| MPEG4.mgnt.Address.16x16-C2 | CBP | C56 |
| MPEG4.mgnt.Address.16x16-C3 | Ac_pred_flag | C58 |
| MPEG4.mgnt.Address.16x16-C4 | The number of MB | C65 |

TABLE 11-continued

| FU-CSCIT | | |
|---|---|---|
| Index No. | CSCI information | CSCI table element |
| MPEG4.mgnt.Address.8x8-C1 | CBP | C56 |
| MPEG4.mgnt.Address.8x8-C2 | Ac_pred_flag | C58 |
| . . . | . . . | . . . |

Other Examples for Expressing the FL 410, the F-RT 420 and the FU-CSCIT 430

TABLE 12

| FL | | | | | |
|---|---|---|---|---|---|
| ID | FU name | input CSCI | output CSCI | Input data | Output data |
| F0092 | MPEG4.mgnt.Address.16x16 | 4 | 0 | QFS | QFSP |
| F0095 | MPEG4.mgnt.Address.8x8 | 4 | 0 | QFSP | PQF |
| F0190 | MPEG4.algo.IAP.8x8 | 2 | 0 | PQF | QF |
| . . . | . . . | . . . | . . . | . . . | . . . |

TABLE 13

| F-RT | | | | |
|---|---|---|---|---|
| Index | FU | Input CS/CI | No. of Branches | Branch information |
| R0 | F0092 | — | 1 | 1: GO R1; |
| R1 | F0095 | — | 1 | 1: GO R2; |
| R2 | F0190 | — | 1 | 1: GO R3; |
| . . . | . . . | . . . | . . . | . . . |

TABLE 14

| FU-CSCIT | | |
|---|---|---|
| Index No. | CSCI information | CSCI table element |
| F0092-C1 | Quantiser_scale | C54 |
| F0092-C2 | CBP | C56 |
| F0092-C3 | Ac_pred_flag | C58 |
| F0092-C4 | The number of MB | C65 |
| F0095-C1 | CBP | C56 |
| F0095-C2 | Ac_pred_flag | C58 |
| . . . | . . . | . . . |

Other Examples for Expressing the FL 410, the F-RT 420 and the FU-CSCIT 430

TABLE 15

| FL | | | | | |
|---|---|---|---|---|---|
| ID | FU name | input CSCI | output CSCI | Input data | Output data |
| 0000200010100001 | MPEG4.mgnt.Address.16x16 | 4 | 0 | QFS | QFSP |
| 0000200010101002 | MPEG4.mgnt.Address.8x8 | 4 | 0 | QFSP | PQF |
| 0000100010111002 | MPEG4.algo.IAP.8x8 | 2 | 0 | PQF | QF |
| . . . | . . . | . . . | . . . | . . . | . . . |

TABLE 16

| F-RT | | | | |
|---|---|---|---|---|
| Index | FU | Input CS/CI | No. of Branches | Branch information |
| R0 | 0000200010100001 | — | 1 | 1: GO R1; |
| R1 | 0000200010101002 | — | 1 | 1: GO R2; |
| R2 | 0000100010111002 | — | 1 | 1: GO R3; |
| . . . | . . . | . . . | . . . | . . . |

TABLE 17

| FU-CSCIT | | |
|---|---|---|
| Index No. | CSCI information | CSCI table element |
| 0000200010100001-C1 | Quantiser_scale | C54 |
| 0000200010100001-C2 | CBP | C56 |
| 0000200010100001-C3 | Ac_pred_flag | C58 |
| 0000200010100001-C4 | The number of MB | C65 |
| 0000200010101002-C1 | CBP | C56 |
| 0000200010101002-C2 | Ac_pred_flag | C58 |
| . . . | . . . | . . . |

As described above, the present invention can efficiently manage the functional unit by giving an inherent ID or/and name to each functional unit. The toolbox 515 can directly manage a pertinent functional unit by using the ID (or/and name) of each functional unit, and a user can access the pertinent functional unit though a decoder description using the ID allotted to each functional unit. For example, if a functional unit forming the IDCT of MPEG2 is assumed to have the inherent ID of 000011A, it is sufficient that a user who tries to use the functional unit forming the IDCT of MPEG2 writes a decoder description allowing the functional unit to be accessed through the ID when forming the decoder description. In other words, it is unnecessary that the user knows which position the functional unit to be used is placed in the toolbox 515. However, whether the ID or name is used may cause a performing speed or reading speed to be changed.

As described above, since the ID used for accessing a particular functional unit is formed to include a combination of optimized letters and numerals, this makes it possible to quickly access the functional unit. Also, forming the toolbox 515 by grouping some functional units having the same signs makes it possible to more quickly search and access the functional unit than the access to the functional unit using the ID. The functional unit name provides the information for allowing a user to easily recognize the ID combination. The functional unit ID and name can be used together like the following example of the F-RT 420.

```
FRT {
    (fu(id:0000100010111002), 1: IF (C10==1) GO R1; 2: GO R2;)
    (fu(name:MPEG4.algo.IDCT.8x8), 1: IF (C10==1) GO R1; 2: GO
    R2;)
  }
```

The CSCIT 440, the SET 450, the S-RT 460 and the DVT 470 are the partial decoder descriptions for generating CSCI control information. The parsing functional unit 610 (or the functional unit performing the syntax parsing in the toolbox 515) uses the CSCI control information in order to extract or generate element information from the conventional bitstream 316 and to store the extracted or generated element information at the CSCI storing unit 532. Next, the CSCIT 440, the SET 450, the S-RT 460 and the DVT 470 will be described. However, since the CSCIT 440 has been described above with reference to FIG. 9, the pertinent description will be omitted.

Firstly, the SET 450 refers to a partial decoder description formed to include information related to the syntaxes of the inputted conventional bitstream 316.

As shown in FIG. 10 through FIG. 13, the SET 450 includes an index of each syntax, an element name, input data, output data and a SET-process (process by SET-PROC). Here, the index refers to an identifier S identifying each syntax used for the S-RT 460. The element name, which is a name of the syntax, can be named with reference to the meaning or function of the syntax. The input data refers to a nominal length of a bit inputted at one time in the conventional bitstream 316. The output data, which is the element information (i.e. CSCI information (C)), refers to a list of the CSCIT 440 referred when acquired data is stored. Here, an output data field can be the name of a buffer memory in which generated element information (or a written address of the pertinent data or an address of the buffer memory in which the pertinent data is written) is supposed to be written. Then, in the case of needing the pertinent element information as input data, the pertinent element data can be read by using the CSCI information (C). The SET-process writes the process including what processing operation is undergone to generate the element information as output data after each bitstream syntax is inputted.

The SET 450 can be written in a technological method such as a textual description or a binary description (i.e. a bit-converted binary code form). The minimum necessary data of the partial decoder description can be written in a similar scripting language.

Then, the S-RT 460 refers to connection information between each syntax in the conventional bitstream 316. In other words, the S-RT 460 has information indicating to call each syntax and to move to a next syntax. The parsing functional unit 610 uses the R-ST 460 to read the conventional bitstream 316 or to define the sequence of storing and/or renewing the element information in the CSCI storing unit 532.

As shown in FIG. 14 though FIG. 17, the S-RT 460 includes an index (R), an index of the syntax (S), input data (C), the number of branches (No. of branches) and branch information.

The index (R) indexes each connection information (Rule). Since the index (S) of the syntax designates the syntax to be processed in a particular connection index, the parsing functional unit (or the functional units performing the syntax parsing) uses the SET 450 to perform the designated process of the pertinent syntax.

The input data indicates a list of the element information to be used for the conditional determination to control the connection of a pertinent connection index.

The number of branches, which is the number of cases capable of being connected to a following syntax, refers to the total number of the branch route of a corresponding connection index. The branch information, which is provided as many quantities as the number of branches (#1, #2, #3 . . . ), refers to a condition determining algorithm determining which connection index is processed next. It is possible to directly determine the sequence and contents of data to be read by the branch information. As shown in FIG. 14 through FIG. 17, if the number of branch is 1, no input data is provided and it directly proceeds to process the connection index designated by the branch information. However, if the number of branch is 2 or more, the condition determination (consists of the following connection information (R) after the conditional sentence) is performed and it proceeds to process a corresponding connection index.

The parsing functional unit 610 renews the CSCI storing unit 532 by processing the syntax defined in pertinent connection index. Then, the parsing syntax unit 610 reads the renewed data by referring to the element information of the CSCI storing unit 380 to use it for branch condition determination. For example, C0 under the branch condition of the branch information of an index R0, "C0==1," is the element information C0 after the syntax S0 is processed.

The S-RT 460 can be written in a technological method such as a textual description or a binary description (i.e. a bit-converted binary code form). The minimum necessary data of the partial decoder description can be written in a similar scripting language.

Finally, the DVT 470 refers to a partial decoder description in which Huffman table information to be used by each encoder/decoder is written. In each encoding, MPEG-1/2/4/AVC performs entropy coding. At this time, a Huffman coding method is mainly used. In this case, the Huffman table is used. It is required to provide the Huffman table information to be used by the pertinent decoder in each decoding in order to realize an integrated codec. Accordingly, the decoding description in accordance with the present invention includes the Huffman table information corresponding to each syntax when the syntax is parsed. Of course, in case that the Huffman table information corresponding to each standard is already written at the description storing unit 510, the transmission of the DVT 470 will be omitted or it is possible to include a codec number (Codec #) and a profile and level number (Profile and level number) only.

As described in FIG. 18 and FIG. 19, the DVT 470 includes a name of each Huffman table, an actual value outputted after being compressed by a Huffman coding and a code value used when the compressed actual value is stored at the conventional bitstream 316. For example, if the actual value, 3, is obtained by compressing an MCBPC value, the code value, 011, is written at the conventional bitstream 316 by a Huffman table mapping work (e.g. a process part of the SET 450). For another example, since VLD[1] is written at a process part of an index S77 of the SET 450, a function VLD is called. The coded value is obtained by reading the conventional bitstream 316 as much as a length (i.e. a fixed length or a variable length) pre-determined by the function. Then, the corresponding actual value can be obtained by the Huffman table mapping work. At this time, a Huffman table [1], which is the first table CBPY, is used.

The DVT 470 can be written in a technological method such as a textual description or a binary description (i.e. a bit-converted binary code form). The minimum necessary data of the partial decoder description can be written in a similar scripting language.

Each partial decoder description can be written in the binary description, to thereby reduce a storage space, improve processing efficiency and drop the time that it takes to transmit the extended bitstream 305 including the decoding description.

Below is described the linking operation between each partial decoder description to be used by the parsing functional unit 610 and/or the connection control unit 534.

In accordance with the present invention, the decoding processing unit 320 of the decoder 300 can start to be operated in various ways. For example, some methods of starting to operate the decoding processing unit 320 will be described.

One example, which is applicable to the decoding processing unit 320 of FIG. 5, is to control the processing relationship (e.g. operation sequence and connection) of the each functional unit of the toolbox 515 by using the connection control information and the CSCI control information received from the decoder forming unit 520. According to this example, as shown in the F-RT 420, the parsing functional unit 610 is firstly loaded among the functional units of the toolbox 515, to thereby allow the element information, evaluated by allowing the conventional bitstream to be syntax-parsed, to be stored at the CSCI storing unit 532. Then, if the control authority is returned to the connection control unit 534 (like an index R72 of the S-RT 460), the corresponding functional unit is loaded to process a following operation, to thereby control the connection of each functional unit.

According to another method, which is applicable to the decoding processing unit 320 of FIG. 6, if the parsing functional unit 610 having received the syntax parsing control information starts to be independently operated and completes the syntax parsing of the conventional bitstream, the connection control unit 534 having received the connection control information controls the connection through the selective loading of decoding functional units. In this case, the connection control unit 534 must previously recognize whether some or all of the element information is completed to be stored at the CSCI storing unit 532. Herein, the connection control unit 534 must continuously monitor whether the necessary element information is stored at the CSCI storing unit 532 or allow the parsing functional unit 610 having stored the element information to report it to the connection control unit 534 (e.g. to allow the control authority to return to the connection control unit 534 like the index R72 of the S-RT 460). Of course, the connection control unit 534 (or a functional unit loaded by the control of the connection control unit 534) and/or the parsing functional unit 610 can be obviously on standby after starting to be operated without monitoring whether the necessary element information is stored at the CSCI storing unit 532 until the necessary information is stored at the pertinent storing unit.

Another example, which is applicable to the decoding processing unit 320 of FIG. 5 or/and FIG. 6, is to start to operate the decoding processing unit 320 by allowing the decoder forming unit 520 to transfer the CSCI control information and the connection control information to the connection control unit 534 and/or the parsing functional unit 610.

The below description focusing on the firstly described example is related to the linking operation between each partial decoder description to be used by the parsing functional unit 610 and/or the connection control unit 534.

Firstly, the connection control unit 534 can read first rule information (Rule) of the F-RT 420 from the description storing unit 510 to call a pertinent functional unit. As shown in the F-RT 420, the connection control unit 534 reads F0(R0) for the first time and load the parsing functional unit of the toolbox 515 in order to start the processing. Starting the processing may be performed by allowing processing blocks of the program codes corresponding to the parsing functional unit 610 to be activated. It is possible to recognize whether the pertinent functional unit is the parsing functional unit by the FL 410.

The parsing functional unit reads the syntax corresponding to the rule information (this can be the information processed by the information processing unit 524) designated by the connection control unit 534 among the rule information (Rule) of the S-RT 460 and generates a corresponding output value to store the generated output value at the CSCI storing unit 532. Information related to which element information is stored at the CSCI storing unit 532 is stored at the CSCIT 440. Next, the parsing functional unit puts the element information stored at the CSCI storing unit 532 into the branch information corresponding to the S-RT 460 and proceeds in order to process an index corresponding to the result. For example, the branch information corresponding to the index R0 is "C0==1." If this condition is satisfied, it proceeds to an index R1. Otherwise, it is processed as an error. This operation is continued until it encounters "GO RT" to allow the control authority to be transferred to the F-RT 420 (i.e. the connection control unit 534) (e.g. the index R72 of the S-RT 460).

However, while the parsing function unit uses the SET 450 to generate element information and to store the generated element information at the CSCI storing unit 532, if a VLD function (e.g. an index S74 of the SET 450) is called, the entropy decoding is performed by using the DVT 470. At this time, if the element information is generated, the generated element information is stored at the CSCI storing unit 532.

In the processing operation of the parsing functional unit, if it encounters "GO RT" and the control authority is transferred to the F-RT 420 (i.e. the connection control unit 534), the connection control unit 534 reads the element information, which is an input value of an index corresponding to the F-RT 420, from the CSCI storing unit 532 and puts the read element information into the branch information, to thereby allow an index to be subsequently processed to be designated.

As described above, if some or all of the element information is stored at the CSCI storing unit 532, the connection control unit 534 allows the decoding to be processed through the loading of the corresponding functional units according to the F-RT 420. The connection control unit 534 can recognize whether a loaded functional unit completes the processing. If the pertinent functional unit completes the processing, the connection control unit 534 directs a following functional unit to perform the processing. Also, the pertinent functional unit stores the processed data at a predetermined buffer memory or the CSCI storing unit 532 for video data processing of a following functional unit. Since the method of allowing the connection control unit 534 to recognize whether a functional unit completes the processing is evident to any person of ordinary skill in the art, the pertinent description will be omitted.

The decoding processing unit 320 can output video data corresponding to the inputted conventional bitstream 316 by allowing the connection control unit 534 to control the processing to be performed according to the aforementioned operation, which is an index sequence written at the F-RT 420 and/or an index sequence depending on the branch condition.

As understood through the foregoing description, a linking loop between partial decoder descriptions of the present invention can be roughly classified as two types. In other words, a F-RT loop is formed to include the F-RT 420, the FL 410, the FU-CSCIT 430, the F-RT 420, a CSCIT (branch condition application, for example) and a F-RT (next rule). An S-RT loop is formed to include the S-RT 460, the SET 450, the CSCIT 440, the S-RT 460, a CSCIT (branch condition application, for example) and a F-RT (next rule).

Also, the F-RT loop can be classified as two types as follows. Firstly, in the case of instructing the execution of the decoding functional unit, the F-RT loop is formed to include the F-RT 420, the FL 410, the FU-CSCIT 430, the F-RT 420, a CSCIT (branch condition application, for example) and a F-RT (next rule). Secondly, in the case of instructing the execution of the parsing functional unit, the F-RT loop is formed to include the F-RT 420, the FL 410, (S-RT loop), the F-RT 420, a CSCIT (branch condition application, for example) and a F-RT (next rule).

The S-RT loop can be classified as two types as follows. Firstly, in the case of branching into the next rule, the S-RT loop is formed to include the S-RT 460, the SET 450, the CSCIT 440, the S-RT 460, a CSCIT (branch condition application, for example) and a F-RT (next rule). Secondly, in the case of returning to the F-RT 420, the S-RT loop is formed to include the S-RT 460, the SET 450, the CSCIT 440, the S-RT 460, a CSCIT (branch condition application, for example) and a F-RT (index the called F-RT 420).

The connection control of the connection control unit 534 according to the F-RT 420 may cause the connection of each functional unit of the toolbox 510 to be changed.

Hereinafter, the commands forming each partial decoder description will be described in detail.

FIG. 20 is an example of a command for constituting a partial decoder description in accordance with an embodiment of the present invention. Information for parsing a syntax of a standard such as MPEG-2/MPEG-4/MPEG-4 AVC (i.e. partial decoder description) can be formed by using each of the commands. The below description focuses on examples of the partial decoder descriptions for parsing a MPEG-2-MP (Main Profile)-intra-coded syntax and the linking relationship between each partial decoder description.

As shown in FIG. 20, each partial decoder description can be formed to include the commands such as READ, SEEK, FLUSH, IF, WHILE, UNTIL, DO~WHILE, DO~UNTIL, BREAK, SET, STOP and PUSH. Of course, all commands are unnecessary for being used in each of the partial decoder descriptions. It is obvious that any command can be selectively used per each partial decoder description. Below is briefly described the use of each command.

Firstly, READ is the command for reading a bit from a bitstream, used as, for example, "READ bits B>CSCI;". Here, "bits" indicates the number of bits to be read. "B" refers to a byte-alignment flag. ">CSCI" indicates a CSCI index to be stored. "B" and ">CSCI" is used as options. If ">CSCI" is not designated, it is determined to be stored at the IBS only.

Next, SEEK is the command for reading a bit from a bitstream but allowing a file pointer not to be moved. The file pointer refers to a reference position for the operation, for example, reading a bit. A parameter of the SEEK command can be applied identically to the above-described REED.

FLUSH is the command for moving the file pointer at a bitstream as many as the number of the bits. Its parameter can be applied identically to the REED.

IF is the command for providing the branch according to a given condition, used as "IF (condition) {~} ELSE {~}".

WHILE is the command for repeatedly performing a designated block during a period of time while the given condition is true, used as "WHILE (condition) {~}".

UNTIL is the command for repeatedly performing a designated block during a period of time until the given condition is true, used as "UNTIL (condition) {~}"

DO~WHILE is the transformation of the WHILE command and the command for performing a block prior to the conditional determination, used as "DO {~} WHILE (condition)".

DO~UNTIL is the transformation of the UNTIL command and the command for performing a block prior to the conditional determination, used as "DO {~} UNTIL (condition)".

For computation, the form (~) (compute) is used as, for example, "(C11=(V2+3));". In other words, all computing formulas of SET-PROC can be written in parentheses, and operators such as arithmetic (i.e. addition, subtraction, multiply and division), substitution, addition/subtraction, (++/−−), bit operation, logical sum/logical product and checking whether CSCI is used.

BREAK is the command for being released from a nearest loop.

SET is the command for setting a flag related to whether to use the designated CSCI. The CSCI to designate flags can be arranged and broken by comma. For example, the CSCI can be broken as SET C0, C2.

STOP is the command for stopping processing the currently-processed syntax element and turning to a next operation.

PUSH is the command for adding given data in the back of written data in an arrangement CSCI. The added values are arranged and broken by comma (e.g. PUSH C8 8, 16, 32;).

GO is the command for branching into a specified position. For example, GOR#;; indicates branching into R#, and GO RT indicates returning to a called position.

HEX is the command for reporting that a hexadecimal follows the HEX command.

RLD is an interface for an RLD function supportable in MPEG-4, used as "RLD index, level, run, islastrun, t#;". Here, index, level, run and islastrun indicates an internal variable and CSCI storing an RLD return value. t# indicates a Huffman table ID used for RLD.

VLD2 is a VLD function for MPEG-2, used as "VLD2 [t#] in >v1, v2, v3;". Here, t# indicates a Huffman table ID used for RLD, and in indicates an index value to be inputted. v1, v2 and v3 indicate an output result value.

Finally, VLD4 is a VLD function for MPEG-4, used as "VLD4 [T#]>CSCI;". Here, t# indicates a Huffman table ID used for RLD, and ">CSCI" indicates a CSCI index to be stored. ">CSCI" is used as an option. If ">CSCI" is not designated, it is determined to be stored at a variable IBS only.

Figure 21:
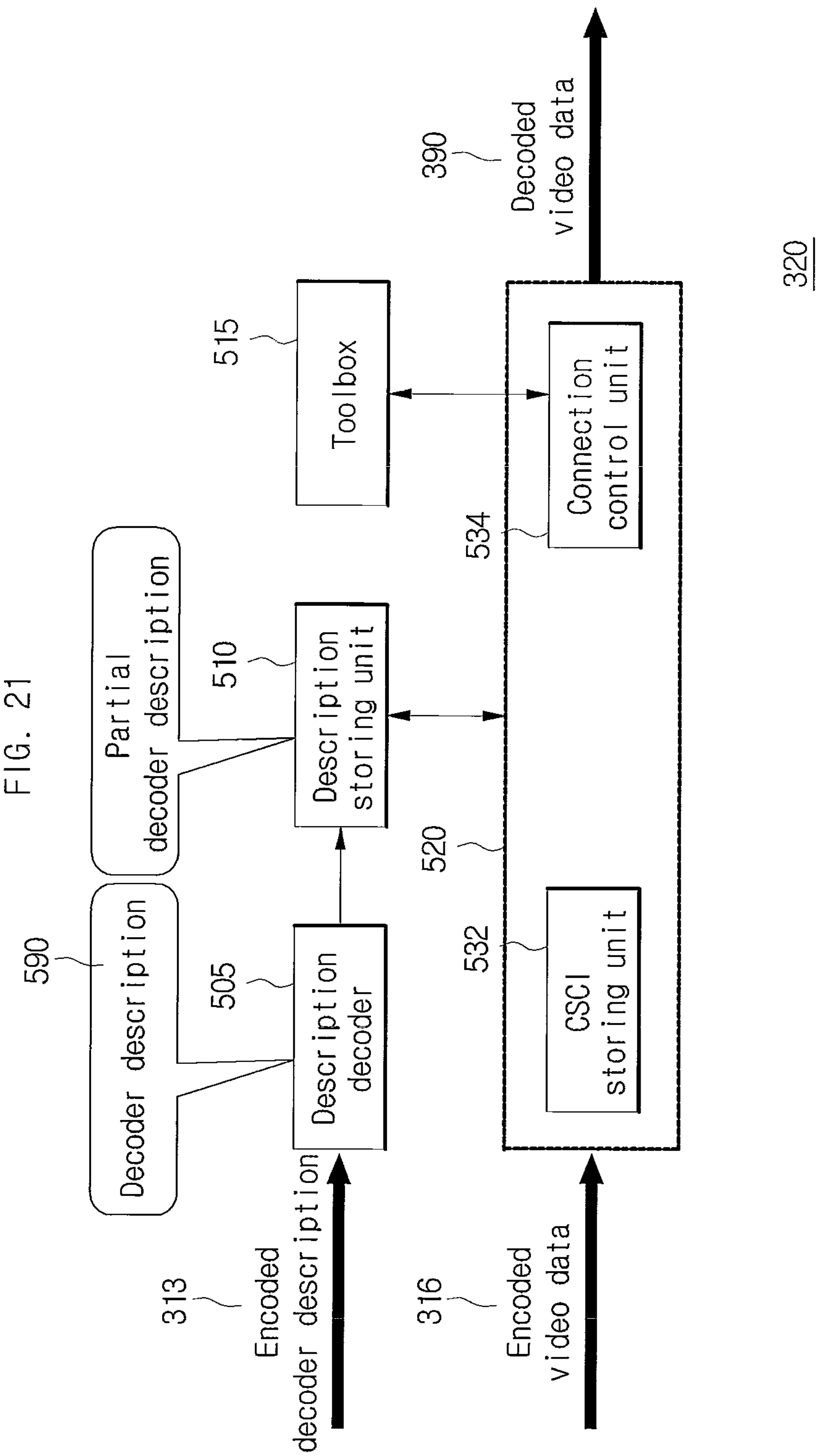
FIG. 21 shows a brief structure of a decoding processing unit in accordance with a third embodiment of the present invention.
Figure 22:
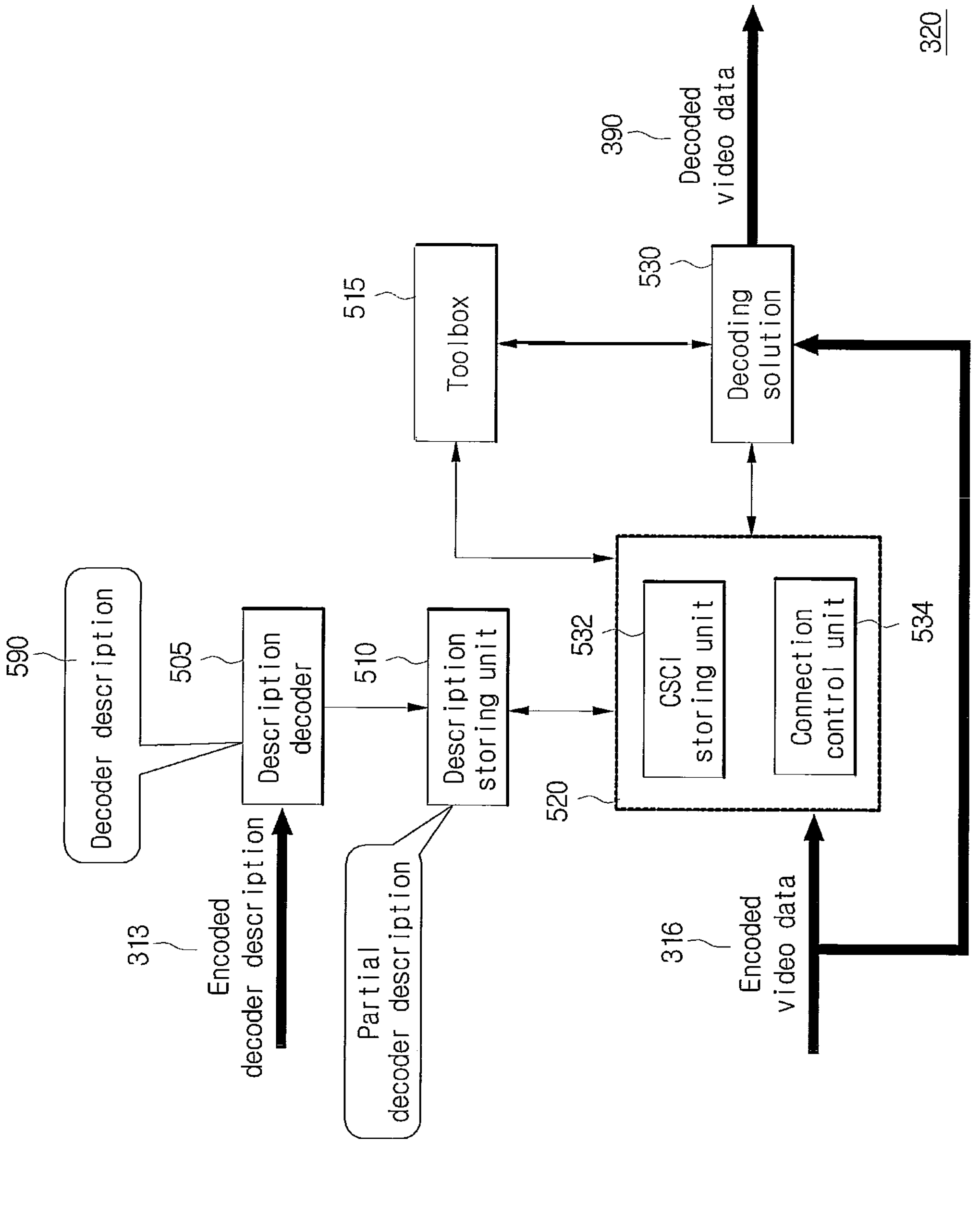
FIG. 22 shows a brief structure of a decoding processing unit in accordance with a fourth embodiment of the present invention.

FIG. 21 shows a brief structure of a decoding processing unit in accordance with a third embodiment of the present invention, and FIG. 22 shows a brief structure of a decoding processing unit in accordance with a fourth embodiment of the present invention.

In the case of the decoding processing unit described with reference to FIG. 5 and FIG. 6, the information processing unit 524 uses the partial decoder descriptions to generate the CSCI control information and the connection control information, and the connection control unit 534 uses the control information generated by the information processing unit 524 to selectively load the functional units of the toolboxes 515. This decodes the encoded video data 316.

However, in the case of the decoding processing unit shown in FIG. 21 and FIG. 22, the connection control unit 534 directly uses the partial decoder descriptions stored at the description storing unit 510 to selectively load at least one functional unit of the toolbox 515. This decodes the encoded video data 316.

Hereinafter, the decoding processing unit shown in FIG. 21 and FIG. 22 will be described. Since there is an only slight difference that the connection control unit 534 can analyze the partial decoder descriptions to perform the corresponding connection control, most of the same description as described with reference to FIG. 5 and FIG. 6 (e.g. the structure of analysis of the partial decoder description) will be omitted.

Referring to FIG. 21 showing the third embodiment of the decoding processing unit 320, the decoding processing unit 320 can include the description decoder 505, the description storing unit 510, the toolbox 515 and the decoder forming unit 520. The decoder forming unit 520 can include the connection control unit 534 and the CSCI storing unit 532. The decoder forming unit 520 can further include a working memory (not shown) for allowing at least one to be loaded by the call of the connection control unit 525 and a predetermined process to be performed.

Also, FIG. 22 shows the fourth embodiment of the decoding processing unit 320. As compared with the decoding processing unit 320 of FIG. 21, the decoding processing unit 320 of FIG. 22 further includes the decoding solution 530. The decoding solution 530 can be the working memory for allowing at least one to be loaded by the call of the connection control unit 525 and a predetermined process to be performed.

As shown in FIG. 21 and FIG. 22, the decoder 300 of the present invention can be re-combined or generated in various forms such that an inputted bitstream can be decoded regardless of encoded formats, by allowing the functional units of the toolbox 515 to be selectively loaded and to be decoded.

As described above, forming the toolbox 515 separately to other elements in the decoder 300 makes it possible to more easily apply different types of toolboxes without any modification of the decoder design structure of other elements. For example, in spite of a decoder manufactured so as to use a toolbox for performing the processing according to an MPEG standard, it becomes easier to substitute a non-MPEG standard having the same interface as the pertinent toolbox or optionally/personally manufactured toolbox for the pertinent toolbox.

Figure 23:
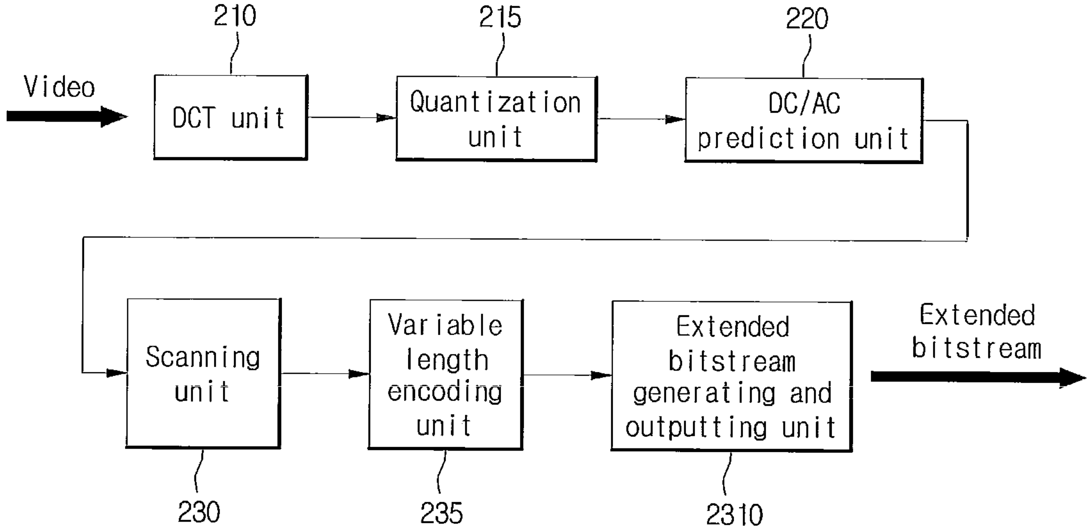
FIG. 23 is a block diagram showing an encoder in accordance with an embodiment of the present invention.

FIG. 23 is a block diagram showing an encoder in accordance with an embodiment of the present invention.

The encoder 2300 of the present invention can further include an extended bitstream generating and outputting unit 2310 as compared with the conventional encoder 200 described with reference to FIG. 2.

The extended bitstream generating and outputting unit 2310 generates a decoder description by using control information (e.g. a list and connection of used functional units and input data, syntax information and syntax connection information of pertinent functional units) of the operation of generating the conventional bitstream 316 generated by the processing of previous operations. The extended bitstream generating and outputting unit 2310 also uses the generated decoder description and the conventional bitstream 316 to generate the extended bitstream 305 and to transfer the generated extended bitstream 305 to the decoder 300. Since the method of generating the decoder description is enough to be understood by any person of ordinary skill in the art through the above description only, the pertinent description will be omitted.

In the description, the variable length encoding unit 235 is merely any element (e.g. encoder) finally performing the encoding to generate the conventional bitstream 316, and not limited to the present invention. This also by no means limits or restricts the spirit and scope of the present invention.

FIG. 23 assumes that the extended bitstream 305 generated by using the decoder description information and the conventional bitstream 316 is provided to the decoder 300. However, as described above, the decoder description can be provided in a form of separate data or bitstreams to the decider 300. In this case, the extended bitstream generating and outputting unit 2310 can be obviously placed independently from the conventional encoding unit 200 in order to independently provide vivid information to the decoder 300, instead of being placed in back of the variable encoding unit 235.

Although the above description focuses on the decoder to describe the integrated codec apparatus and the method thereof in accordance with the present invention, reciprocal relationship between the decoder and the encoder is evident to any person of ordinary skill in the art and the decoder is obviously not limited to the present invention in consideration that the encoder can be easily formed by using only detailed description.

As described above, the integrated codec apparatus and the method thereof in accordance with the present invention makes it easy to analyze a syntax element and control the connection of the functional units in one standard (or codec) or between different standards (or codecs). In other words, it is possible to change the sequence of syntax elements in the bitstream to be generated according to a certain standard, to insert a new syntax element or to delete the existing syntax elements.

In accordance with the conventional art, the decoder is unable to normally decode a pertinent bitstream when a syntax element is manipulated. For example, if the corresponding bitstream is re-formed and transmitted by changing the sequence of the bitstream information from ABC to ACB, the decoder is not able to recognize the re-formed bitstream. This makes it impossible to normally decode the re-formed bitstream. Similarly, if the bitstream is re-formed as ABFC by newly inserting F or as AC by deleting B, the decoder is also not able to recognize the re-formed bitstream.

However, using the decoding device and the method thereof in accordance with the present invention can allow the decoder description information to be included in an expanded bitstream or to provide the decoder description information as independent data, the decoder 300 can smoothly permit decoding operation.

Hitherto, the syntax analyzing method for the bitstream decoding and the decoding device in accordance with the present invention has been described based on the MPEG-4 AVC. However, it is naturally that the present invention can be identically applied to the MPEG-1, MPEG-2, MPEG-4 and other video data encoding/decoding standards without any restriction.

Similarly, it is obvious that the information included in each partial decoder description can be also written as information for performing the decoding by a plurality of standards, instead of being written by using only information related to connection relationships between the functional units for performing the decoding by one standard and the processing operation requested for the pertinent functional unit.

For example, it is assumed that a plurality of initial frames of an encoded video data included in an extended bitstream, a plurality of following frames and other frames are encoded in MPEG-2, MPEG-4 and MPEG-1, respectively. In this case, in order to decode the encoded video data, the partial decoder description information included in a decoder description is obviously defined such that the functional units conforming to each standard included in the toolbox 335 can be organically coupled in order to process each frame encoded by using different encoding methods.

Hitherto, although some embodiments of the present invention have been shown and described for the above-described objects, it will be appreciated by any person of ordinary skill in the art that a large number of modifications, permutations and additions are possible within the principles and spirit of the invention, the scope of which shall be defined by the appended claims and their equivalents.

INDUSTRIAL APPLICABILITY

The present invention is applicable to a video codec.

The invention claimed is:

1. A decoding device, comprising:

a memory configured to store a toolbox that includes a plurality of functional units which independently perform a predetermined decoding process and which are distinguished by CSCI (Control Signal and Context Information) control information and connection control information, wherein the toolbox includes sub-toolboxes which are sets of functional units formed based on the application standard field, and the functional units performing a same function with a different performance method are bound up into one group;

a decoder description storing memory configured to store a decoder description that is divided into partial decoder descriptions; and a connection controller configured to:

receive, from a decoder forming device, the CSCI control information and the connection control information in a CSCI storage memory and a connection controller, respectively, use the stored partial decoder descriptions to control more than one functional unit of the plurality of functional units to be selectively loaded from the toolbox by using the connection control information received from the decoder forming unit, and control a bitstream to be decoded as a video datum via the more than one functional unit selectively loaded from the toolbox and connected together via the connection control information and the CSCI control information, wherein the decoder forming device is configured to:

determine that at least one function unit in the plurality of functional units is not included in the toolbox, and automatically update the toolbox to include at least one new functional unit to replace the at least one functional unit not included in the toolbox, wherein the identification information of each functional unit includes a combination of the application standard field and each of:

a list field (LIST) specifying a plurality of application standards, a role field (ROLE) according to a function distinction, a name field (NAME) corresponding to a functional unit algorithm, a property field (PROPERTY) indicating a functional unit property or information related to a process, a size field (SIZE) indicating a size of a block to be processed by a functional unit, and an implementation field (IMPLEMENTATION) indicating additional information related to a functional unit performance, wherein the partial decoder descriptions stored at the description storing memory include at least one of:

a functional unit list (FL), a functional unit rule table (F-RT), a functional unit CSCIT (FU-CSCIT), a control signal and context information table (CSCIT), a syntax element table (SET), a syntax-rule table (S-RT), and a default value table (DVT), wherein at least one of the CSCIT, the SET, the S-RT, and the DVT is used to generate the CSCI control information, and wherein at least one of the FL, F-RT, the FU-CSCIT, the S-RT, and the DVT is used to generate the connection control information.

2. The decoding device of claim 1, wherein the toolbox comprises:

at least one parsing functional unit configured to perform a syntax parsing of the bitstream, and a plurality of decoding functional units configured to decode the parsed bitstream.

3. The decoding device of claim 1, wherein the CSCI storing memory is configured to store a plurality of element information generated by a syntax parsing of the bitstream, wherein the syntax parsing is executed by the more than one functional unit.

4. The decoding device of claim 3, wherein the plurality of functional units includes at least one parsing functional unit configured to perform the syntax parsing of the bitstream according to the CSCI control information, and wherein the toolbox comprises a plurality of decoding functional units for decoding the bitstream.

5. The decoding device of claim 1, further comprising:

a description decoder configured to use an encoded decoder description, input corresponding to the bitstream, to generate at least one partial decoder description and store the generated at least one partial decoder description or to designate at least one of the partial decoder descriptions pre-stored at the decoder description storing memory.

6. The decoding device of claim 5, further comprising:

a dividing device configured to divide an integrated bitstream, which the encoded decoder description and the bitstream are integrated in, into the encoded decoder description and the bitstream and to output the encoded decoder description and the bitstream.

7. The decoding device of claim 1, wherein the more than one functional unit loaded by the connection controller perform a predetermined process having at least one of a predesignated element information and an output datum output by a previously loaded functional unit as an input datum.

* * * * *